US009508045B2

(12) United States Patent
Fisher

(10) Patent No.: US 9,508,045 B2
(45) Date of Patent: Nov. 29, 2016

(54) CONTINUOUS-TIME BAUM-WELCH TRAINING

(75) Inventor: David Charles Fisher, Evergreen, CO (US)

(73) Assignee: Raytheon Company, Waltham, MA (US)

(*) Notice: Subject to any disclaimer, the term of this patent is extended or adjusted under 35 U.S.C. 154(b) by 1133 days.

(21) Appl. No.: 13/588,912

(22) Filed: Aug. 17, 2012

(65) Prior Publication Data

US 2016/0155062 A1    Jun. 2, 2016

(51) Int. Cl.
*G06N 99/00* (2010.01)
*G06N 7/00* (2006.01)

(52) U.S. Cl.
CPC ............ *G06N 99/005* (2013.01); *G06N 7/005* (2013.01)

(58) Field of Classification Search
None
See application file for complete search history.

(56) References Cited

U.S. PATENT DOCUMENTS

| 5,937,384 | A | * | 8/1999 | Huang | G06K 9/6297 704/251 |
| 2004/0167893 | A1 | * | 8/2004 | Matsunaga | G06K 9/6297 |

OTHER PUBLICATIONS

Botta et al., Learning Complex and Sparse Events in Long Sequences, 2004, ECAI.*
Ben-Yishai et al., A Discriminative Training Algorithm for Hidden Markov Models, May 2004, IEEE Transactions on Speech and Audio Processing, vol. 12, No. 3, pp. 204-217.*
Alamino, R., et al., "Online Learning in Discrete Hidden Markov Models", Proc. AIP Conference, vol. 872(1), (2007), 187-194.
Haslum, K., et al., "Multisensor Real-Time Risk Assessment Using Continuous-Time Hidden Markov Models", Computational intelligence and Security, Lecture Notes in Computer Science, vol. 4456/2007, (2007), 694-703.
Wei, W., et al., "Continuous-time hidden Markov models for network performance evaluation", Performance Evalualtion, 49, (Sep. 2002), 129-146.
Zraiaa, M., "Hidden Markov Model: A Continuous-Time Version of the Baum-Welch Algorithm", Submitted in partial fulfilment of the requirements for the MSc Degree in Advanced Computing of Imperial College London [online]. [retrieved on Nov. 9, 2011]. Retrieved from the Internet: <URL: http://www.doc.ic.ac.uk/teaching/distinguished-projects/2010, (Sep. 2010), 61 pgs.

* cited by examiner

*Primary Examiner* — Alan Chen
(74) *Attorney, Agent, or Firm* — Schwegman Lundberg & Woessner, P.A.

(57) ABSTRACT

The apparatus, systems, and methods described herein may operate to receive information identifying and describing at least one of a set of events, an initial distribution of a plurality of states, an initial transition matrix, or an initial event matrix; generate, based at least in part on the information, at least one intermediate transition matrix and at least one intermediate event matrix describing a sparse Baum-Welch training that allows no event to occur at one or more time steps; and transform the at least one intermediate transition matrix and the at least one intermediate event matrix into a transition matrix and an event matrix describing a continuous-time Baum-Welch training, the continuous-time Baum-Welch training allowing events to occur simultaneously or at sporadic time intervals in a Markov model including a hidden Markov Model (HMM) having more than two hidden states.

20 Claims, 8 Drawing Sheets

CONTINUOUS-TIME BAUM-WELCH TRAINING

GOVERNMENT RIGHTS

This invention was made with Government support under contract number FA8750-09-C-0018 awarded by the Saranac project, sponsored by the Air Force Office of Scientific Research. The Government has certain rights in this invention.

BACKGROUND INFORMATION

Continuous-time Hidden Markov Models (CHMMs) have been used in various technical areas, such as network performance evaluation, risk assessment, flash memory workload, and many other settings. CHMMs (having a finite number of states and events, but where the states and/or events can change at any time) are not to be confused with Continuous-state Hidden Markov Models (where there is a continuum of states) or Continuous-Events Hidden Markov Models (where there is a continuum of events).

Baum-Welch (BW) training is an expectation-maximization learning algorithm for discrete Hidden Markov Models. Given a set of events, Baum-Welch training may be used to find a Hidden Markov Model that may local maximize the likelihood that the events come from the Hidden Markov Model. No tractable (polynomial-time) algorithm is known for the global expectation-maximization problem.

Also associated with Hidden Markov models is the Baldi-Chauvin algorithm, an online smoothing expectation-maximizing algorithm, and Viterbi's method, which may find the most likely hidden states given a Hidden Markov Model and events that arise from it.

DETAILED DESCRIPTION

Introduction

Figure 1:
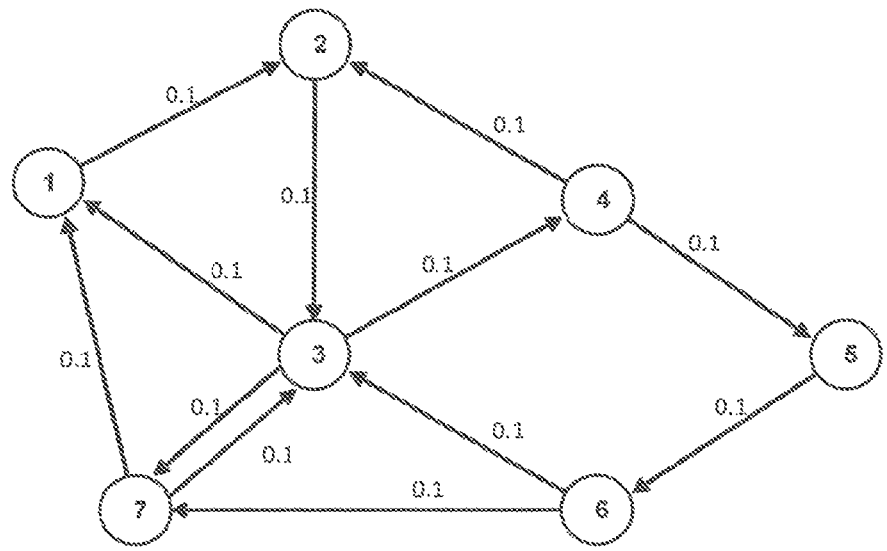
FIG. 1 shows a directed graph of a Markov model, according to various embodiments.

Hidden Markov Models are widely used to describe stochastic situations. They may be used to generate sequences of events. Further techniques exist, most notably Baum-Welch training, to find a Hidden Markov Model to best match a sequence of events. Hidden Markov Models may be used for threat indication and warning. For example, in one embodiment, discrete Hidden Markov Models may have exactly one event per time step. In certain situations, however, events may come at varying times with no inherent time-step, or events may occur simultaneously. A 'continuous-time' Hidden Markov Model and Baum-Welch training according to various embodiments are proposed herein. The continuous-time Hidden Markov Model and Baum-Welch training allow, for example, reflecting the rate and timing of events or associated states in more enhanced manners than existing technologies.

In various embodiments, instead of directly developing a continuous-time Baum-Welch training, a discrete Baum-Welch training may be implemented first. The discrete Baum-Welch training may be algebraically equivalent to a native MATLAB implementation (although faster and simpler). A series of algebraically equivalent computer programs may be created. In one embodiment, verification at each step may be performed, for example, by showing that differences between the discrete Baum-Welch training and the native MATLAB implementation are only from rounding.

The resulting continuous-time Baum-Welch training, according to various embodiments, may form a generalization of the discrete Baum-Welch training in that it may accept one event per time step as input. In various embodiments, the continuous version may be faster than the discrete version even when used in this form where one event is accepted per time step. In addition, in various embodiments, the continuous-time Baum-Welch training may support any number of hidden states. More detailed explanations of the continuous-time Hidden Markov Model and Baum-Welch training according to various embodiments are provided below.

Example Related Work

In various embodiments, CHMMs may be used in network performance evaluation, risk assessment, flash memory workload, and many other settings. CHMMs (having a finite number of states and events, but where states and events may change at any time), according to various embodiments, are not to be confused with continuous-state Hidden Markov Models (where there is a continuum of states) or continuous-events Hidden Markov Models (where there is a continuum of events).

In various embodiments, Baum-Welch training may comprise an expectation-maximization learning algorithm, for example, for discrete Hidden Markov Models. For example, in one embodiment, given a set of events, it may find a Hidden Markov Model that local maximizes the likelihood that the events come from it. No tractable (polynomial-time) algorithm is known for the global expectation-maximization problem.

Also associated with Hidden Markov models is the Baldi-Chauvin algorithm, an on-line smoothing expectation-maximizing algorithm, and Viterbi's method, which may find the most likely hidden states given a Hidden Markov Model and events that arise from it.

Hidden Markov Models and Baum-Welch Training

This section describes Markov models, Hidden Markov Models, and a modified Mat lab version of the discrete Baum-Welch training, according to various embodiments.

Markov Models

Markov Models are widely used to describe stochastic systems. A Markov Model may have initial state $S_0$ and an n×n transition matrix T whose entry $t_{jk}$ is the probability that the model goes from state j in step i to state k in step i+1.

FIG. 1 shows a directed graph of the Markov model, according to various embodiments. For example, referring to FIG. 1, the Markov Model may have 7 states, $S_0$ through $S_6$. Nodes (circles) may represent states, and arcs may represent transitions between the states. Numbers may indicate the probability of transitions. Implicit are 1-loops (arcs from a node to itself) whose probability is one minus the sum of the probability of the arcs leaving a node.

Equation (1) may comprise the transition matrix for the Markov Model shown in FIG. 1. In one embodiment, for example, each row may add to 1, indicating that it is certain to go to a state at the next step. The diagonal entries may indicate the probability of staying in the same state from one step to the next.

$$\begin{bmatrix} 0.9 & 0.1 & 0 & 0 & 0 & 0 & 0 \\ 0 & 0.9 & 0.1 & 0 & 0 & 0 & 0 \\ 0.1 & 0 & 0.7 & 0.1 & 0 & 0 & 0.1 \\ 0 & 0.1 & 0 & 0.8 & 0.1 & 0 & 0 \\ 0 & 0 & 0 & 0 & 0.9 & 0.1 & 0 \\ 0 & 0 & 0.1 & 0 & 0 & 0.8 & 0.1 \\ 0.1 & 0 & 0.1 & 0 & 0 & 0 & 0.8 \end{bmatrix} \quad (1)$$

Tables 1-4 are related to the MATLAB function StateGenerate, according to various embodiments. The StateGenerate function may create a sequence of States consistent with the Markov Model. Table 1 shows the Matlab code for StateGenerate, according to various embodiments. Given a transition matrix T and an initial state st, this may give a sequence of L random states may be identified using the Markov model.

TABLE 1

StateGenerate

```
function States=StateGenerate(L,T,st)
cumsumT=cumsum(T,2);
for j=1:L
    st=find(cumsumT(st,:)>rand,1);
    States(j)=st;
end
```

Table 2 describes the input and output of StateGenerate, according to various embodiments. Table 3 describes the Matlab functions used in StateGenerate, according to various embodiments. Table 4 shows a one-thousand (1000) state sequence outputted from StateGenerate for the transition matrix in equation (1) starting in state 1, according to various embodiments.

TABLE 2

Input and Output for StateGenerate

| Type | Name | Description |
| --- | --- | --- |
| Input | L | The number of steps in the Markov state sequence. |
|  | T | A nonnegative n × n transition matrix with rows adding to 1. |
|  | st | The initial state. Must be a positive integer of at most n. |
| Output | States | A randomly generated Markov state sequence of length L. |

TABLE 3

Matlab functions used in StateGenerate

| Function | Description | Role in StateGenerate |
| --- | --- | --- |
| cumsum | With 2 (for $2^{nd}$ dimension) as its second input, finds the cumulative sum along each row of a matrix. | For the transition matrix T in (1), cumsum(T,2) is: $\begin{bmatrix} 0.9 & 1 & 1 & 1 & 1 & 1 & 1 \\ 0 & 0.9 & 1 & 1 & 1 & 1 & 1 \\ 0.1 & 0.1 & 0.8 & 0.9 & 0.9 & 0.9 & 1 \\ 0 & 0.1 & 0.1 & 0.9 & 1 & 1 & 1 \\ 0 & 0 & 0 & 0 & 0.9 & 1 & 1 \\ 0 & 0 & 0.1 & 0.1 & 0.1 & 0.9 & 1 \\ 0.1 & 0.1 & 0.2 & 0.2 & 0.2 & 0.2 & 1 \end{bmatrix}$ |
| rand | A uniform distributed random number between 0 and 1. | Gives a number whose probability that it is between the $(k-1)^{st}$ and $k^{th}$ entry of row j of cumsumT equals the transition probability from state j to state k in T. |
| find | With 1 as its $2^{nd}$ input, finds the $1^{st}$ value where a vector is true. | find(cumsumT(st,:),1>rand) is the index of the $1^{st}$ entry in row st greater than a random number. |

TABLE 4

A State Sequence

```
11111 12222 22222 33333 44445 55555 55556 66666 31112 22222
22222 22222 22233 44555 56334 42222 23333 34444 44444 22222
22377 77773 33331 12331 11111 11111 11111 11111 22222 22222
22222 34444 44444 44444 45556 77333 33333 33333 11112 22222
33333 33337 11222 22222 22222 34444 22223 33444 44422 23333
11111 11111 11222 22222 22222 22222 22233 33333 77111 11223
33333 33373 11111 11222 22222 22222 22222 33333 77777 11111
11111 11111 11111 22222 22222 22222 23377 77771 11111 11111
22222 22222 22222 22223 33331 11111 11122 22222 22222 22222
22222 23333 33333 77331 11111 12333 31111 11111 11111 11111
11111 11111 11111 11111 12222 22223 34444 44444 42222 22222
22333 44555 56666 66777 77771 11112 22331 11111 11111 11111
11111 11111 11111 11111 22222 22233 31123 44444 42333 33311
11111 11111 22233 33344 44222 22333 73333 33333 42222 22222
22333 11111 11112 22222 22222 22222 22222 22222 22222 22223
33333 33333 33377 11111 11111 11111 11111 11111 11112 22222
23333 33331 11111 11111 11111 11111 11111 11111 11112 22222
33331 11222 22222 22222 22222 22222 22222 37777 77733 33111
11111 12222 22222 22222 23373 77777 77111 11111 11111 12222
```

Referring to Table 4, in one embodiment, states may be in groups of five (5). So the model may start in state 1, go to state 2 for two steps, then go to state 3 for two steps, and so forth. In one embodiment, most adjacent states may be from a state to itself. This may be because the diagonal entries may dominate the transition matrix in equation (1), for example. Also, in one embodiment, the only transitions for one state to another may be associated with arcs in FIG. 1. For example, there may be several instances of "31" but no instances of "13."

Hidden Markov Models

Hidden Markov Models may extend Markov Models by including 'events.' In various embodiments, in a Hidden Markov Model, States may be unobservable (or hidden). However, at each step, one event may occur probabilistically based on the state. A (finite and discrete) Hidden Markov Model may be described by a transition matrix as in equation (1), and an event Matrix whose entry $e_{mj}$ is the probability that the Hidden Markov Model may emit event in if the model is in state j.

Figure 2:
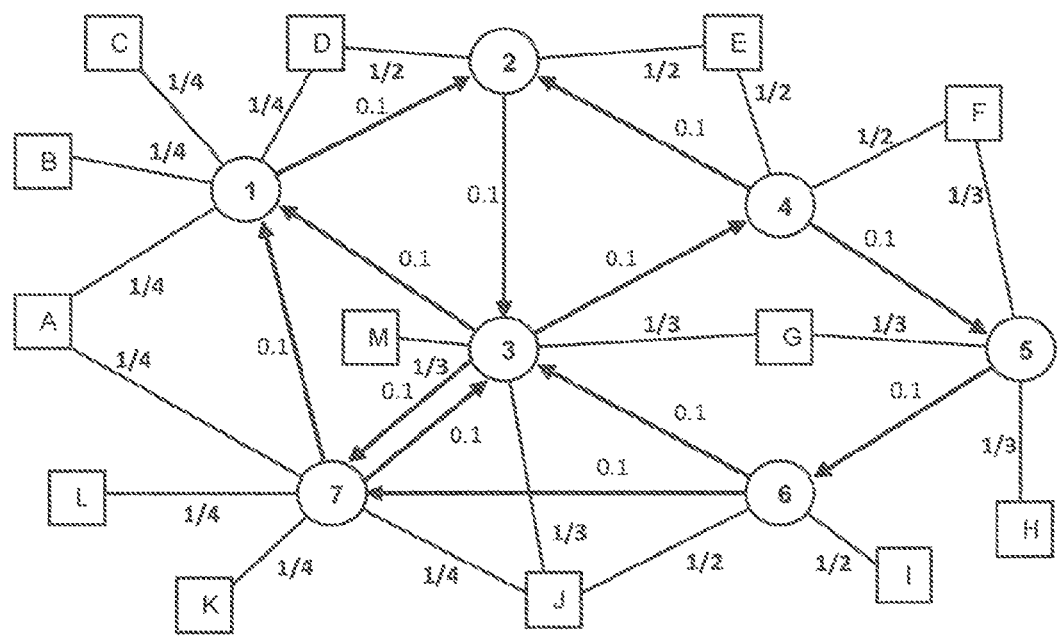
FIG. 2 shows a Hidden Markov Model, according to various embodiments.

FIG. 2 shows the Hidden Markov Model, according to various embodiments. This adds events (squares) to the Markov Model of FIG. 1. Fractional values on edges between a state and an event (there are no edges between events) may indicate the probability of an event from a particular state. For example, from state 3, events G, M and J may have one-third probability each.

Equations (1) and (2) may provide a transition matrix and an event matrix for the Hidden Markov Model illustrated in FIG. 2. For example, the (1,7) entry (upper right) in the matrix in equation (2) may be one-fourth (¼), which matches one-fourth (A) on the edge between event A and state 7. Zero entries may correspond to no edge. In one embodiment, the matrix in (2) may have one column per state and one row per event. Since the probability of an event is one for each state, each column may add to one.

$$\begin{bmatrix} 1/4 & 0 & 0 & 0 & 0 & 0 & 1/4 \\ 1/4 & 0 & 0 & 0 & 0 & 0 & 0 \\ 1/4 & 0 & 0 & 0 & 0 & 0 & 0 \\ 1/4 & 1/2 & 0 & 0 & 0 & 0 & 0 \\ 0 & 1/2 & 0 & 1/2 & 0 & 0 & 0 \\ 0 & 0 & 0 & 1/2 & 1/3 & 0 & 0 \\ 0 & 0 & 1/3 & 0 & 1/3 & 0 & 0 \\ 0 & 0 & 0 & 0 & 1/3 & 0 & 0 \\ 0 & 0 & 0 & 0 & 0 & 1/2 & 0 \\ 0 & 0 & 1/3 & 0 & 0 & 1/2 & 1/4 \\ 0 & 0 & 0 & 0 & 0 & 0 & 1/4 \\ 0 & 0 & 0 & 0 & 0 & 0 & 1/4 \\ 0 & 0 & 1/3 & 0 & 0 & 0 & 0 \end{bmatrix} \quad (2)$$

Table 5 shows a Matlab function, EventGenerate, that may generate a Hidden Markov Model event sequence that corresponds to a state sequence, according to various embodiments. For example, in one embodiment, EventGenerate may create an event sequence using Event matrix E and corresponding to state sequence st.

TABLE 5

EventGenerate function Events=EventGenerate(States,E)
cumsumE=cumsum(E);

TABLE 5-continued

EventGenerate for j=1:length(States)
  Events (j)=find(cumsumE(:,States(j))>rand,1);
end Table 6 describes input and output for EventGenerate, according to various embodiments. In one embodiment, EventGenerate may be similar enough to StateGenerate that Table 3 may suffice to explain its Matlab functions.

TABLE 6

Input and Output for EventGenerate

| Type | Name | Description |
| --- | --- | --- |
| Input | States | A Markov state sequence of length L. |
|  | E | An event Matrix. Must be a nonnegative matrix with at least as many rows as the largest entry of States. |
| Output | Events | A Hidden Markov event sequence of length L. |

Table 7 shows a one-thousand (1000) step Hidden Markov event sequence created by EventGenerate for the state sequence in Table 4 and the event Matrix of (2), according to various embodiments. In one embodiment, for example, events are grouped in five (5). While appearing more random than the states shown in Table 4, this clearly deviates from randomness. For example, steps 765 to 799 (most of the row 16) are only Ds and Es corresponding to a long string of 2s in Table 3. This makes sense because D and E are the only events for state 2.

TABLE 7

| An Event Sequence | | | | | | | | | |
| --- | --- | --- | --- | --- | --- | --- | --- | --- | --- |
| CDEGJ | CBADJ | GLKML | JGMKM | ABAED | DEDED | EDEEE | EDEJC | BABAD | DACAD |
| DADAC | DEEEE | DDDDD | JMJJM | FFFFG | GFFHG | GGHGJ | JJIJJ | JDBDD | DDDDE |
| EEDEE | EDDEE | DDEJJ | EEHHH | FIGJE | FDDEE | DGJGJ | MFEEE | FEFFE | EDDEE |
| EEJMA | LLMKM | MGJMC | BEJMB | BCDBD | CDABC | BACCC | CABBA | EEDED | EDEDE |
| EDEDD | MEFEF | FFEFF | EEFFE | EFFFI | AKGMG | MJGJM | MJMMG | BAACE | EEDEE |
| GJMMM | JJJGL | CCDDD | DEEED | DEDEE | GFFFF | EEEEG | JJFEF | FFEEE | EMGJG |
| BCDDB | DBDDD | BBDEE | EEEDE | DDEEE | DEEDD | DEDMM | JJMMJ | LKBCD | CAEDJ |
| GMGGJ | JJJKJ | CCDCB | DADDD | DDDED | DEEEE | EEEDD | JGMGJ | MKLMM | DABDC |
| CCDCA | BBDCC | CBCCA | EEDEE | DDDEE | DEEEE | DJJKA | AMAMA | CCACA | CCAAA |
| DDEEE | EDEDE | DEDEE | EEEDG | JJMGC | CADCB | DCBEE | EEDDE | EDDDD | DEDDD |
| DDDDD | DJGJM | GMGJG | AAGGB | AACDD | ADJJG | GBAAD | BDDAC | CCCAD | ABDDB |
| BCDDC | BDBDA | CCABA | BBCAC | BDDDE | EEEDJ | GEEFF | FEEFF | FEEED | EDDDD |
| EDMGG | FEHHG | FJJJI | IJLLL | LKLAA | DBCDD | DDMJB | ABBAB | ACACD | ABCAB |
| CADDD | CBCAD | CCAAB | DDCCA | EEDED | DEDMJ | JDDEG | EFEEE | FEMGG | MMJBA |
| DCDAC | BDABB | EEDGG | MJGEE | FFDDE | DDMJJ | LMGJM | GJJGG | FEDED | EEDED |
| EDGJM | ABCAD | DCABE | EEEED | EDDDE | EEEEE | EDDDE | EEEDE | EDEDD | DDEDG |
| GGGMJ | JGMJM | JJMMK | DDBBC | DCBCD | CCBAA | ABADC | AAABA | ACBDD | DDDDE |
| DMMMJ | GGJMB | BCDAC | CBDBA | CCBDD | DAAAC | ABDCB | ABDAB | DACDD | DEEEE |
| GMJJA | DCEED | EDEEE | DDEEE | EEEED | EDDED | DEDDD | JKLAA | AKMGM | MMDBB |
| CBDDC | BEDDD | EEEED | EDEEE | EMJAJ | AAKAL | LLBDC | DDBCB | CDCAD | ADEED |

Likelihood of Events and Forward Analysis

Given a Hidden Markov Model with transition matrix T, event matrix E, and initial state $S_0$, the probability of an event sequence, such as $O_1 O_2 \ldots O_L$, may be derived. Table 8 shows a function, Forward, that may be used in deriving the probability of such an event sequence, according to various embodiments. This likelihood may be used as a natural measure of how well a Hidden Markov Model models an event sequence. For example, referring to Table 8, given a transition matrix T, an event matrix F, a set of events, and an initial distribution, f, this may create a set of (modified) distributions, f and a logarithm of the likelihood.

TABLE 8

Forward

```
function [loglike,f,scaling]=Forward(Events,T,E,f)
    for i=1:length(Events)
        scaled=(f(i-1,:)*T).* E(Events(i),:);
        scaling(i)=sum(scaled);
        f(i,:)=scaled/scaling(i);
    end
    loglike=sum(log(scaling));
```

Given a Hidden Markov Model in state j at step i, the probability that event v occurs and the Hidden Markov Model moves to state k at step i+1 may be calculated, for example, as shown in equation (3):

$$p(((S_i = k) \wedge (O_i = v)) | (S_{i-1} = j)) = \qquad (3)$$
$$P((O_i = v) | (S_i = k))P((S_i = k) | (S_{i-1} = j)) = E_{vk}T_{jk}$$

where $E_{km}$ is the probability of emitting event v when the Hidden Markov Model is in state k, and $T_{jk}$ is the probability of going from state j to state k in one step.

In various embodiments, let f(i) be the probability distribution of states at step given events $O_1 O_2 \ldots O_{i-1}$ so its $j^{th}$ entry $f(i)_j = P(S_i = j)$ is the probability that the Hidden Markov Model is in state j at step i. Then, given that the Hidden Markov Model at step i emits event M, the $k^{th}$ entry of f(i) may be calculated, for example, as shown in equation (4):

$$f(i)_k = \sum_j f(i)_k E_{mk} T_{jk} / \sum_k \sum_j f(i)_k E_{mk} T_{jk}. \qquad (4)$$

In various embodiments, equation (3) may be used to compute f(i) row vector) with matrix-vector operations (· is entry by entry vector multiplication, $E_m$ is the $m^{th}$ row of E, and $( )_k$ is the $k^{th}$ entry):

$$f(i) = \sum_j (f(i)_k T) \cdot E_m / \sum_k ((f(i)_k T) \cdot E_m). \qquad (5)$$

In one embodiment, the denominator in (5) may be the sum of the entries in the numerator. This allows normalizing f(i) so its entries may add to one.

In various embodiments, the normalization scaling factor may be the probability that the Hidden Markov Model emits Events $O_i$ at step i given state distribution f(i). Thus, given an initial state, the probability of an event sequence may be the product of the scaling factors. In one embodiment, this probability may be profoundly small. To avoid underflows, Forward may compute the logarithm of the probability. This log-likelihood may comprise the sum of the logarithms of the scaling factors.

In various embodiments, Forward may also estimate the hidden state sequence. The estimate may be 'fuzzy' in that each step is a probabilistic combination. Often a combination may Skew to one state, and it may be said that the sequence is in that state. In one embodiment, in other steps, several states may have significant probability. Since Forward may output probabilistic combinations of states, the initial state may also be a probabilistic combination. If the initial state is state k, the initial state may be input as a zero vector except for one in the $k^{th}$ entry.

Table 9 shows input and output for Forward, according to various embodiments. Table 10 describes the Matlab function and operations that are used within in Forward, according to various embodiments.

TABLE 9

Input and Output for Forward

| Type | Name | Description |
|---|---|---|
| Input | Events | An Event sequence of positive integers with length L. |
| | T | A nonnegative n × n transition matrix whose rows add to one. |
| | E | A nonnegative Event Matrix whose columns add to one. It must have n rows and at least as many columns as the maximum of Events. |
| | f | The probability distribution at step 0. This must a nonnegative row vector whose entries add to one. If the Hidden Markov Model is in state k at step 0, f is a zero except for a one in the $k^{th}$ entry. |
| Output | loglike | A negative number. The logarithm of the probability that the Hidden Markov Model with transition matrix T, Event Matrix E, and initial state f will generate Event sequence Events. |
| | f | A matrix whose $i + 1^{th}$ row is the probability distribution of States in the step i given the first i entries of Events. |
| | scaling | The likelihood of moving from one event to the next given Transition Matrix T and Event Matrix E. |

In various embodiments, Forward may be tested with the transition matrix of equation (1), the event matrix of equation (2), and the event sequence in Table 7. This may give the logarithm of the likelihood being about −1477.06. Then the likelihood may be about $e^{-1477.06} \sim 3.3 \times 10^{-642}$, which is the probability that the 1000-event sequence in equation (4) would occur in the Hidden Markov Model of FIG. 2 when started at state 1. This may be smaller than the smallest positive number ($4.9 \times 10^{-324}$), so it may round to zero if directly calculated. Its geometric mean ($1000^{th}$ root) may be about 0.2283, which is the root-mean probability per step. This is reasonable compared to the entries of E (the probability per step is a weighted average of event probabilities).

TABLE 10

Matlab functions and operations used in Forward

| Matlab Function or Operation | Description | Role in Forward |
|---|---|---|
| length | Length of a vector. | length (Events) is the number of Events. |
| .* | Entries by entry vector product. | (f(i,:)*T).* E(Events(i),:) is a vector whose $k^{th}$ entry is the probability the $i^{th}$ Event occurred and the Hidden Markov Model is in state k. |
| log | Natural logarithm | sum(scaled) is the probability of Events(i) at step i; sum(log(scaling)) adds the logarithm of the probability at each step. |
| sum | Adds the entries of a vector. | |

In various embodiments, the other output of Forward may also be informative. The Hidden Markov Model may be used to predict the hidden state from an event sequence as it is being generated. The vector f(i) may be a 'forward prediction' of the state in step i given Events $O_1 O_2 \ldots O_i$ (without knowing the Events after step i).

Figure 3:
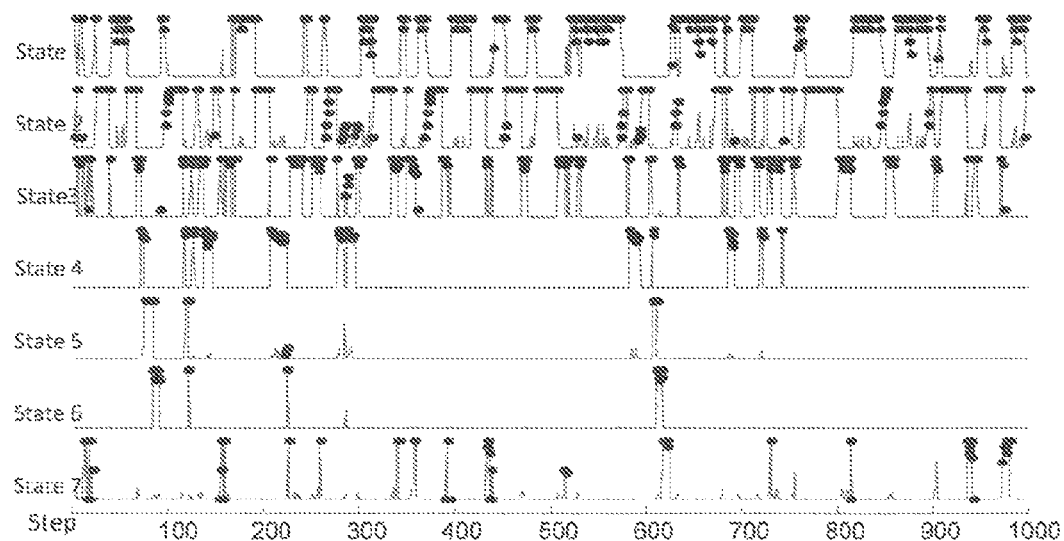
FIGS. 3-4 show a forward probability of each state, according to various embodiments.
Figure 4:
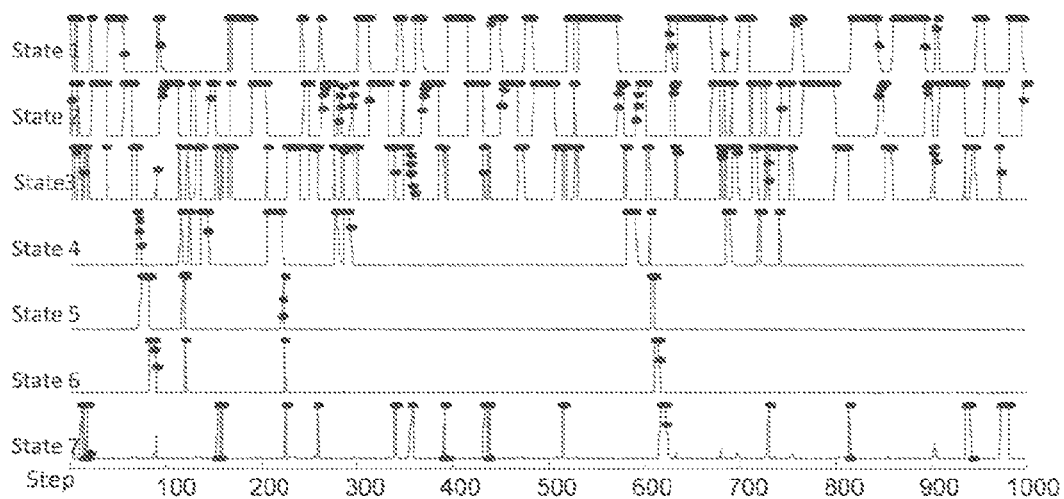

The curves in FIGS. 3 and 4 show the forward probability of each state, for example, using Forward in the above example, according to various embodiments. Note that the probabilities are mostly either essentially zero or near one. The (black) dots show the actual (hidden) state from Table 4 plotted onto the curve associated with its state. Most (black) dots are on points where the curve is near one.

Example Forward-Backward Algorithm

In various embodiments, the Forward algorithm may find the probability distribution of hidden states at step k given the first k events (a priori estimate). The Forward-Backward algorithm may find the probability distribution given all events (a posteriori estimate). The Forward algorithm may comprise the 'forward' of the Forward-Backward algorithm. The 'backward' may comprise the Hidden Markov Model run backwards through time.

In various embodiments, a backward Hidden Markov Model may have the same event matrix as its forward Hidden Markov Model, but its transition matrix may be transposed because the probability of going from state j to state k in the Hidden Markov Model may equal the probability of going from state k to state j the backward Hidden Markov Model. Once the backward distribution $b(i)_k$ is found, the 'smoothed' distribution $p(i)_k$ may essentially be (up to a scalar) the product of forward and backward distribution.

$$p(i)_k = \Pr(S_i = k | O_1 \ldots O_n) \propto \Pr(S_i = k | O_1 \ldots O_i) \Pr(S_i = k | O_{i+1} \ldots O_n) \propto f(i)_k b(i)_k. \quad (6)$$

In various embodiments, the backward distribution calculation may differ from the forward calculation, for example, in three ways:
- The backward distribution at step i may not depend on the event at step i, so it may not be multiplied by column $O_i$ of the event matrix.
- Instead of normalizing, the backwards distribution may be scaled with the scaling for the forward distribution.
- The initial value for the backward distribution may be a vector of ones.

The last two items assure the smoothed distribution may be normalized.

In various embodiments, Function ForwardBackward in Table 11 implements the forward-backward algorithm according to various embodiments. Its input and output are similar to Forward so an input/output table may be unnecessary. In one embodiment, for example, the only difference may be that the forward distribution (f) may be replaced by the smoothed distribution (p).

In various embodiments, ForwardBackward may be compared with Forward by testing ForwardBackward with the transition matrix in equation (1), the event matrix in equation (2), and the event sequence in Table 7. The bottom curve shows the smoothed probability for each state, and the (black) dots show the hidden state from Table 3 plotted onto the curve associated with its state.

TABLE 11

ForwardBackward

```
function [loglike,p,f,b]=ForwardBackward(Events,T,E,f)
for i=1:length(Events)
    scaled=(f(i,:)*T).* E(Events(i),:);
    scaling(i)=sum(scaled);
    if(i+1,:)=scaled/scaling(i);
end
loglike=sum(log(scaling));
b=ones(length(Events)+1,size(T,2));
```

TABLE 11-continued

ForwardBackward

```
for i=length(Events):-1:1
    b(i,:)=(b(i+1,:).*E(Events(i),:))*T'/scaling(i);
end
p=f.*b;
```

Referring to Table 11, given a transition matrix T, an event matrix E, a set of Events, and an initial distribution, f, this may create a set of distributions, p, and a logarithm of the likelihood. For example, in various embodiments, Forward-Backward may give better estimates of hidden states than Forward. Comparing graphs in FIGS. 3 and 4, dots in the tower graph (FIG. 4) are closer to one than those in the upper graph (FIG. 3). The average probability of a state in Table 3 may be about 96.35% (compared to 91.56% for Forward), and the highest probability state may be the actual state 97.2% (compared to 94.0%) of the time.

In various embodiments, in training where the Event sequence is known in advance, ForwardBackward may be used and may give superior estimates of hidden states (time differences are trivial). However, in 'real time' running (estimating the current hidden state based on ongoing Events), Forward may be used. ForwardBackward and Forward may give the same probability distribution for the latest step, but Forward may be calculated as events occur, while ForwardBackward may need to redo the backward estimates at each new step.

Baum-Welch Training

In various embodiments, Baum-Welch training may answer to the question: "Given a string of events, what hidden Markov model best explain the events?" The state sequence and also the transition and event matrices may be unknown. While Matlab has a native version of Baum-Welch training in its statistical toolkit, Table 12 may give a new, shorter version.

While the implementation in Table 12 may be faster in various embodiments, one reason for creating a new Matlab version of Baum-Welch training may be because algebraic manipulation of the Baum-Welch training may be needed to create a continuous-time Baum-Welch training, for example. In one embodiment, for example, the native version and its subservient functions may have 294 lines of code versus 26 for the new version.

In various embodiments, given events as training data, Baum-Welch training may compute a maximum likelihood estimate for the parameters (transition and event matrices) of a Hidden Markov Model. The process to compute the maximum likelihood estimate may be iterative in that the process may use the value of the parameters in the previous iteration to find a new set of values with a higher likelihood.

For each iteration, in various embodiments, Baum-Welch training may find the forward and backward probability. Based on this, it may find the frequency of a transition-event pair and divide it by the probability of the entire string. This may amount to finding the expected count of the particular transition-event pair. Each time a particular transition is found, the value of the quotient of the transition may be divided by the probability of the entire string, and this value may then be made the new value. Since the likelihood may not decrease between iterations, Baum-Welch training may tend to converge to a local maximum of the likelihood. However, this may not mean it will converge to a model with maximum likelihood (a global maximum).

Function BaumWelch in Table 12 may implement Baum-Welch training, according to various embodiments. Its main loop may iterate until either the increase in log-likelihood between consecutive iterations falls below a tolerance, or the maximum number of iterations occurs. The forward-backward algorithm may be done within the main loop. Its result may be used to find a new transition and event matrix. Referring to Table 12, in various embodiments, given a set of events and an initial distribution of state, f, and an initial guess for the transition matrix 1 and event matrix E, this may create a transition matrix T and event matrix E that may locally best match the events. Table 13 gives input and output for BaumWelch, according to various embodiments.

TABLE 12

BaumWelch

```
function
  [T,E,loglike]=BaumWelch(Events,T,E,f,maxIter,tol)
  b=ones(length(Events)+1,size(T,2)); oldloglike=−inf;
  for r=1:maxIter
    [loglike,p,f,b]=ForwardBackward(Events,T,E,f);
    E=zeros(size(E));
    for j=1:length(Events)
      E(Events(j),:)=E(Events(j),:)+p(j+1,:);
    end
    R=T.*((f(1:end−1,:)'*b(1:end−1,:))/T');
    for k=1:size(T,2)
      T(k,:)=R(k,:)/sum(R(k,:));
      E(:,k)=E(:,k)/sum(R(:,k));
    end;
    if loglike<oldloglike+tol, break, end
    oldloglike=loglike;
  end
```

TABLE 13

Input and Output of BaumWelch

| Type | Name | Description |
|---|---|---|
| Input | Events | An Event sequence of positive integers with length L. |
| | T | A nonnegative n × n matrix whose rows add to one. This is the initial value of the transition matrix. |
| | E | A nonnegative matrix whose columns add to one. It must have n columns and at least as many rows as the largest value in Events. This is the initial value of the Event Matrix. |
| | f | The probability distribution at step 0. It must a nonnegative row vector whose entries add to one. If the Hidden Markov Model is in state k at step 0, f is a zero except for a one in the $k^{th}$ entry. |
| | maxIter | Maximum number of iteration of the forward-algorithm. |
| | tol | Iteration stops when the increase in log-likelihood in consecutive iterations is less than tol. |
| Output | T E | Transition and Event Matrices that together maximizes the likelihood. |

In various embodiments, the power and shortcomings of the Baum-Welch training may be seen by running Baum-Welch on the Event sequence in equation (4). For example, in one embodiment, an initial state of [1, 0, 0, 0, 0, 0, 0] and a tolerance of about 0.0001 may be used. The initial event matrix may comprise a random nonnegative normalized (columns sum to 1) 13×7 matrix. A 7×7 matrix with is on the diagonal and off-diagonal entries chosen uniformly on [0,1] may be used. Each row may be divided by its sum to get a normalized nonnegative diagonally-dominated transition matrix. During fifty-three (53) iterations (about 0.56 seconds), BaumWelch may give the following transition and event matrix shown in equation (7):

$$\begin{bmatrix} 0.7589 & 0.1969 & 0 & 0 & 0.0442 & 0 & 0 \\ 0 & 0.7329 & 0.0907 & 0 & 0.0572 & 0.1192 & 0 \\ 0.0630 & 0.0010 & 0.8307 & 0.0055 & 0 & 0 & 0.0997 \\ 0 & 0 & 0.0612 & 0.7578 & 0.0942 & 0.0867 & 0 \\ 0 & 0 & 0 & 0 & 0.9164 & 0 & 0.0836 \\ 0 & 0 & 0 & 0.1349 & 0.1519 & 0.7132 & 0 \\ 0 & 0 & 0 & 0.0982 & 0 & 0 & 0.9018 \end{bmatrix} \quad (7)$$

and $$\begin{bmatrix} 0 & 0 & 0 & 0 & 0.2380 & 0.2752 & 0 \\ 0 & 0 & 0 & 0 & 9.2385 & 0 & 0 \\ 0 & 0 & 0 & 0 & 0.2752 & 0 & 0 \\ 0 & 0 & 0 & 0 & 0.2511 & 0 & 0.4674 \\ 0 & 0 & 0.4662 & 0 & 0 & 0 & 0.5326 \\ 0.2837 & 0 & 0.5338 & 0 & 0 & 0 & 0 \\ 0.3676 & 0.0333 & 0 & 0.3128 & 0 & 0 & 0 \\ 0.3228 & 0 & 0 & 0 & 0 & 0 & 0 \\ 0.0260 & 0.2610 & 0 & 0 & 0 & 0 & 0 \\ 0 & 0.7057 & 0 & 0.3786 & 0 & 0.0392 & 0 \\ 0 & 0 & 0 & 0 & 0 & 0.2201 & 0 \\ 0 & 0 & 0 & 0 & 0 & 0.2894 & 0 \\ 0 & 0 & 0 & 0.3081 & 0 & 0.1762 & 0 \end{bmatrix}$$

In various embodiments, by using Forward, the log-likelihood for the matrices in equation (7) may be about −1456.83, which is better (greater likelihood) than the −1477.06 for the matrices of equations (1) and (2).

The matrices in equation (7) may look very different than those in equations (1) and (2). However, columns of the event matrix in equation (7) may be similar to the columns of equation (2). For example, column 1 of equation (2) may be similar to column 5 of the event matrix in equation (7). Thus, for example, State 1 in FIG. 2 may have similar events to state 5 in the Hidden Markov Model of equation (7). Continuing this way, States 1, 2, 3, 4, 5, 6, and 7 in FIG. 2 may have similar events to States 5, 7, 4, 3, 1, 2, and 6, respectively, in the Hidden Markov Model of equation (7). Rearranging rows and column of the transition matrix and columns of event matrix in equation (7) may provide the matrices shown in equation (8), as follows:

$$\begin{bmatrix} 0.9164 & 0.0836 & 0 & 0 & 0 & 0 & 0 \\ 0 & 0.9018 & 0.0982 & 0 & 0 & 0 & 0 \\ 0.0942 & 0 & 0.7578 & 0.0612 & 0 & 0 & 0.0867 \\ 0 & 0.0997 & 0.0055 & 0.8307 & 0.0630 & 0.0010 & 0 \\ 0.0442 & 0 & 0 & 0 & 0.7589 & 0.1969 & 0 \\ 0.0572 & 0 & 0 & 0.0907 & 0 & 0.7329 & 0.1192 \\ 0.1519 & 0 & 0.1349 & 0 & 0 & 0 & 0.7132 \end{bmatrix} \quad (8)$$

and

-continued $$\begin{bmatrix} 0.2380 & 0 & 0 & 0 & 0 & 0 & 0.2752 \\ 0.2385 & 0 & 0 & 0 & 0 & 0 & 0 \\ 0.2725 & 0 & 0 & 0 & 0 & 0 & 0 \\ 0.2511 & 0.4674 & 0 & 0 & 0 & 0 & 0 \\ 0 & 0.5326 & 0 & 0.4662 & 0 & 0 & 0 \\ 0 & 0 & 0 & 0.5338 & 0.2837 & 0 & 0 \\ 0 & 0.0333 & 0.3128 & 0 & 0.3676 & 0.0333 & 0 \\ 0 & 0 & 0 & 0 & 0.3228 & 0 & 0 \\ 0 & 0.2610 & 0 & 0 & 0.0260 & 0.2610 & 0 \\ 0 & 0.7057 & 0.3786 & 0 & 0 & 0.7057 & 0.0392 \\ 0 & 0 & 0 & 0 & 0 & 0 & 0.2201 \\ 0 & 0 & 0 & 0 & 0 & 0 & 0.2894 \\ 0 & 0 & 0.3081 & 0 & 0 & 0 & 0.1762 \end{bmatrix}$$

In various embodiments, the matrices in equation (8) may be fairly similar to matrices in equations (1) and (2). It may be unreasonable to expect an exact reproduction of the underlying model since it is based on stochastic data. Rearrangement of states may be as expected, because no state information may be used in Baum-Welch training other than the initial state (in various embodiments, the states may be 'hidden').

Matlab's native function hmmtrain may also implement Baum-Welch training. It may be verified that BaumWelch is algebraically equivalent to hmmtrain by running both on the same data. For example, for n=1, 2, . . . , 125, a random Hidden Markov model with n hidden states and 2n possible events may be created. Off-diagonal entries of the transition matrix may be uniformly chosen from [0,1/n), and diagonals entries may be chosen, for example, to make the row add to one (1). Entries of the Event matrix may be uniformly chosen on [0,1), and each column may be normalized by dividing through by its sum so that each column may add to one (1). StateGenerate (Table 1) may create 10n states. Those states may then be used by EventGenerate (Table 5), for example, to create 10n events.

Figure 5:
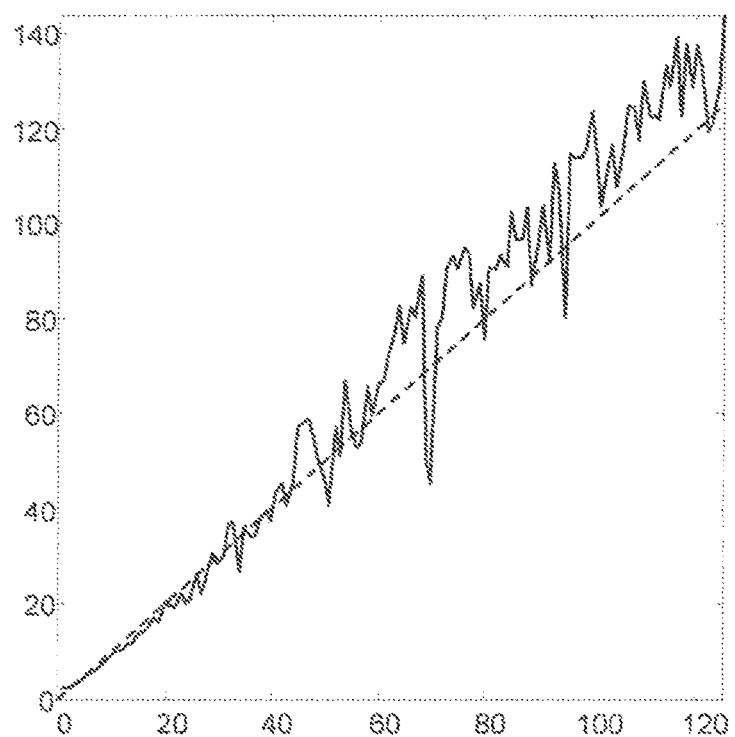
FIG. 5 shows a ratio of run times for hmmtrain vs. BaumWelch, according to various embodiments.

FIG. 5 shows a ratio of run times for hmmtrain versus BaumWelch, according to various embodiments. Referring to FIG. 5, the curved line is the ratio of run times between the legacy Baum-Welch Training and the Baum-Welch Training in Table 11 for n hidden states, 2n possible events, and 10n events for n=1, 2, . . . , 125. Both training algorithms may be algebraically equivalent. The straight line is where the ratio equals n.

For each run, in various embodiments, maximum iteration may be set to 1000 and tolerance to about 0.0001 (in one embodiment, default values for hmmtrain). Initial values for the matrices may be selected independently but by the same process as described above. Both programs may provide nearly identical output with the maximum difference between entries of the output matrices of about $1.52 \times 10^{-10}$, which may be attributable to rounding. FIG. 5 shows Baum-Welch may be over n times faster in various embodiments.

Continuous-Time Hidden Markov Models

This section develops a continuous analog to the discrete hidden Markov Model discussed in the previous section, according to various embodiments.

Continuous-Time Markov Models

In a Continuous-Time Markov Model, according to various embodiments, changes from one state to another may happen at any time. Transition probabilities in discrete Markov Models may become transition rates in the continuous-time. For example, in one embodiment, a (finite) Continuous-Time Markov Model may have initial state $S_0$, and may be described by an n×n transition matrix T whose entry $t_{jk}$ is the rate that the model leaves from state j for state k.

Figure 6:
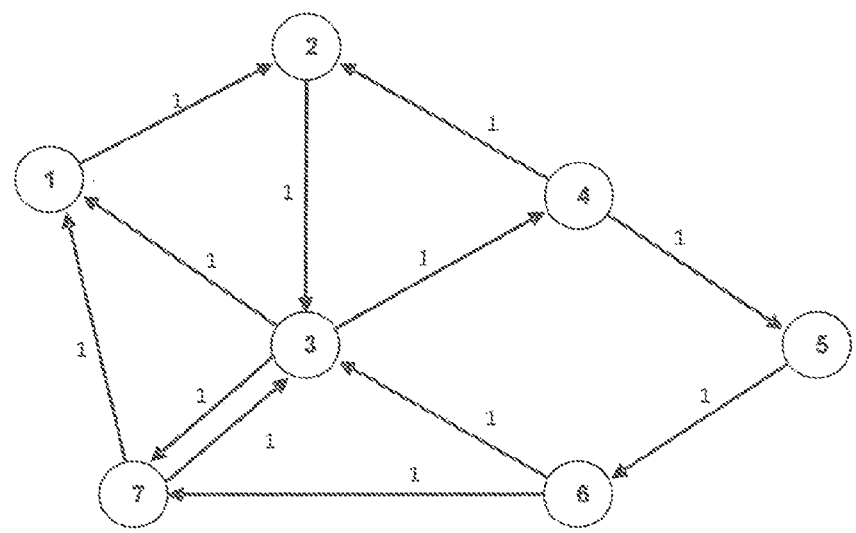
FIG. 6 shows an example of a Continuous-time Markov Model according to various embodiments.

FIG. 6 shows an example of the Continuous-time Markov Model, according to various embodiments. Referring to FIG. 6, in various embodiments, nodes may represent states, and arcs may represent transitions between the states. Numbers may indicate the probability rate of transitions. Implicit in this graph may be one (1)-loops (arcs from a node to itself) whose probability may be one minus the sum of the probability of the arcs leaving a node.

In various embodiments, equation (9) may comprise the transition matrix for the Continuous-time Markov Model in FIG. 6. The diagonal entries may be the rate (which is negative) that the model leaves the state. Note that each row may add to zero (0), as shown in equation (9). This may assure that the rate at which the model leaves a state equals the rate at which the model goes to a new state.

$$\begin{bmatrix} -1 & 1 & 0 & 0 & 0 & 0 & 0 \\ 0 & -1 & 1 & 0 & 0 & 0 & 0 \\ 1 & 0 & -3 & 1 & 0 & 0 & 1 \\ 0 & 1 & 0 & -2 & 1 & 0 & 0 \\ 0 & 0 & 0 & 0 & -1 & 1 & 0 \\ 0 & 0 & 1 & 0 & 0 & -2 & 1 \\ 1 & 0 & 1 & 0 & 0 & 0 & -2 \end{bmatrix} \quad (9)$$

Table 14 shows a Matlab function, CStateGenerate, for generating continuous-time state sequences, according to various embodiments. In various embodiments, given a transition matrix T, an interval I, and an initial state, st, this may create a matrix whose first column is state, and the second column is the transition times. Table 15 shows input and output for CStateGenerate, according to various embodiments. Table 16 shows a continuous-time Markov state sequence using CStateGenerate for the transition matrix in equation (9) starting in state 1 on the interval [0,100], according to various embodiments. Referring to Table 16, in various embodiments, the states and their starting times may be rounded to the nearest thousandth of a unit. So, for example, the Continuous-time Markov Model may be in state 1 on [0,0.201), state 2 on [0.201,0.436), and so on.

TABLE 14

CStateGenerate

```
function States=CStateGenerate(I,T,st)
    cumsumT=cumsum(T−diag(diag(T)),2);
    time=I(1); States=zeros(0,2);
    while time<I(2)
        States(end+1,:)=[st,time];
        time=time+log(rand)/T(st,st);
        st=find(−rand*T(st,st)<cumsumT(st,:),1);
    end
```

TABLE 15

Input and Output for CStateGenerate

| Type | Name | Description |
|---|---|---|
| Input | I | A 2-array. The interval for the Markov state sequence. |
| | T | An n × n transition matrix with nonnegative off-diagonal entry whose rows add to 0. |
| | st | The (initial) state. Must be a positive integer of at most n. |
| Output | States | An k × 2 array of a continuous-time state sequence on I. The first column is States, and the second is times. |

TABLE 16

State Sequence for a Continuous-Time Markov Model

| 1 | 2 | 3 | 4 | 2 | 3 | 7 | 3 | 7 | 3 | 7 | 3 | 1 | 2 | 3 |
|---|---|---|---|---|---|---|---|---|---|---|---|---|---|---|
| 0.000 | 0.201 | 0.436 | 0.793 | 0.826 | 1.508 | 1.908 | 1.992 | 2.275 | 3.606 | 4.185 | 4.405 | 4.615 | 5.012 | 6.836 |
| 4 | 2 | 3 | 4 | 2 | 3 | 1 | 2 | 3 | 7 | 3 | 7 | 1 | 2 | 3 |
| 6.954 | 7.010 | 7.252 | 7.336 | 7.833 | 9.459 | 9.528 | 12.514 | 12.976 | 13.063 | 13.198 | 13.412 | 13.692 | 14.693 | 15.546 |
| 4 | 5 | 6 | 3 | 7 | 3 | 4 | 5 | 6 | 7 | 1 | 2 | 3 | 7 | 1 |
| 15.948 | 17.014 | 18.367 | 18.416 | 18.470 | 18.600 | 18.971 | 19.130 | 20.081 | 20.420 | 20.913 | 22.633 | 23.708 | 24.684 | 24.993 |
| 2 | 3 | 7 | 1 | 2 | 3 | 1 | 2 | 3 | 7 | 1 | 2 | 3 | 1 | 2 |
| 27.154 | 29.398 | 29.574 | 29.931 | 30.209 | 30.887 | 31.013 | 31.057 | 31.236 | 31.503 | 31.776 | 32.412 | 34.261 | 34.646 | 34.980 |
| 3 | 7 | 3 | 7 | 1 | 2 | 3 | 7 | 1 | 2 | 3 | 7 | 3 | 1 | 2 |
| 35.100 | 35.400 | 35.581 | 36.137 | 36.233 | 36.812 | 39.488 | 39.513 | 39.597 | 40.091 | 42.716 | 42.819 | 43.012 | 43.138 | 45.629 |
| 3 | 1 | 2 | 3 | 4 | 5 | 6 | 7 | 3 | 7 | 3 | 1 | 2 | 3 | 1 |
| 46.660 | 46.924 | 47.135 | 48.495 | 49.319 | 50.923 | 50.981 | 51.060 | 51.188 | 51.215 | 51.928 | 53.555 | 57.257 | 57.423 | 57.702 |
| 3 | 7 | 3 | 1 | 2 | 3 | 4 | 5 | 6 | 7 | 3 | 7 | 1 | 2 | 3 |
| 59.703 | 59.824 | 59.870 | 59.972 | 60.191 | 60.332 | 60.357 | 61.613 | 62.419 | 62.810 | 62.937 | 63.409 | 63.435 | 63.464 | 63.727 |
| 4 | 5 | 6 | 3 | 7 | 3 | 1 | 2 | 3 | 1 | 2 | 3 | 7 | 3 | 4 |
| 63.795 | 64.233 | 66.077 | 66.292 | 66.413 | 67.391 | 67.562 | 68.433 | 69.319 | 69.596 | 69.810 | 71.433 | 71.671 | 72.541 | 72.555 |
| 2 | 3 | 7 | 3 | 4 | 2 | 3 | 7 | 3 | 4 | 2 | 3 | 7 | 3 | 1 |
| 72.672 | 72.815 | 72.958 | 73.603 | 74.451 | 74.799 | 75.695 | 75.956 | 76.048 | 77.475 | 78.402 | 79.554 | 79.649 | 80.596 | 80.763 |
| 2 | 3 | 4 | 2 | 3 | 1 | 2 | 3 | 4 | 5 | 6 | 3 | 1 | 2 | 3 |
| 80.929 | 84.076 | 84.640 | 85.035 | 85.054 | 85.552 | 86.060 | 89.948 | 90.427 | 90.651 | 90.827 | 91.187 | 91.393 | 92.237 | 94.396 |
| 7 | 3 | 7 | 3 | 1 | 2 | 3 | 7 | 1 | 2 | 3 | 7 | 3 | 4 | |
| 94.670 | 94.753 | 94.931 | 95.248 | 96.039 | 96.327 | 96.738 | 96.767 | 96.844 | 97.919 | 98.807 | 99.029 | 99.343 | 99.937 | 100.000 |

Events in a Continuous-Time Hidden Markov Models

In various embodiments, a Continuous-time Hidden Markov Model may allow events at any time (not just at even time steps). Events may be instantaneous. An event may occur at a rate based on the state. For example, in one embodiment, a Continuous-time Hidden Markov Model may be described by an n×n transition rate matrix T as in equation (9), and an event matrix whose (m,j) entry may be the rate at which the Continuous-time Hidden Markov Model may emit event M if a model is in state j.

Figure 7:
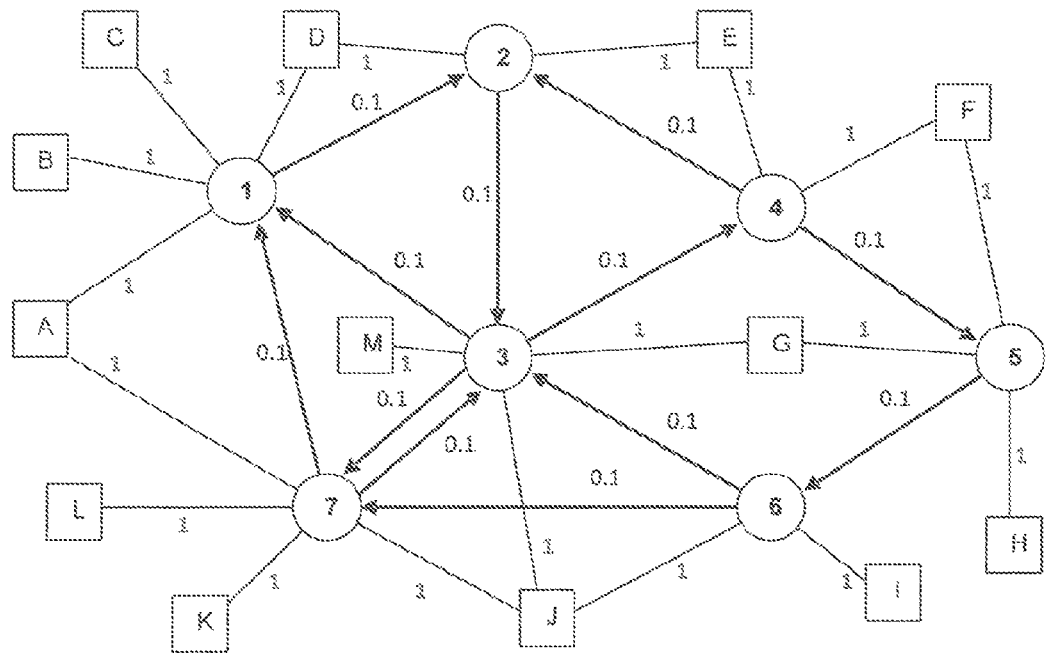
FIG. 7 shows an example of a Continuous-time Hidden Markov Model, according to various embodiments.

FIG. 7 shows an example of a Continuous-time Hidden Markov Model, according to various embodiments, which may add events (represented by squares) to the Markov Model of FIG. 1. Values between states and events may indicate the rate of an event occurring from a particular state. In various embodiments, a Continuous-time Hidden Markov Model may have a transition matrix, T, and an initial state, $S_0$, just like a Hidden Markov Model. It may also have an event matrix, E, for the event probabilities (the numbers associated with an arc between a rectangle and a circle, as shown in FIG. 7). Equation (10) may comprise the event matrix for FIG. 7.

$$\begin{bmatrix} 1 & 0 & 0 & 0 & 0 & 1 \\ 1 & 0 & 0 & 0 & 0 & 0 \\ 1 & 0 & 0 & 0 & 0 & 0 \\ 1 & 1 & 0 & 0 & 0 & 0 \\ 0 & 1 & 0 & 1 & 0 & 0 \\ 0 & 0 & 0 & 1 & 1 & 0 \\ 0 & 0 & 1 & 0 & 1 & 0 \\ 0 & 0 & 0 & 0 & 1 & 0 \\ 0 & 0 & 0 & 0 & 1 & 0 \\ 0 & 0 & 1 & 0 & 0 & 1 \\ 0 & 0 & 0 & 0 & 0 & 1 \\ 0 & 0 & 0 & 0 & 0 & 1 \\ 0 & 0 & 1 & 0 & 0 & 0 \end{bmatrix} \quad (10)$$

Table 17 shows a Matlab function, CEventGenerate, for generating a continuous-time Hidden Markov Model event sequence corresponding to a state sequence, according to various embodiments. Referring to Table 17, given an m×2 matrix of states and times, and event matrix E, this may create a p×2 matrix of events and times for a Continuous-time Hidden Markov Model. For example, Table 17 shows a Continuous-time Hidden Markov Model event sequence created for the state sequence in Table 10 with the event matrix in equation (10).

Table 18 shows input and output for CEventGenerate, according to various embodiments. Table 19 shows a sample set of one thousand (1,000) events generated by CEventGenerate, according to various embodiments. Referring to Table 19, this may use the states in Table 16 and event matrix of equation (2). For example, in one embodiment, event D may be at 0.145 and 0.197, and M may be at 0.502, and so on.

TABLE 17

CEventGenerate

```
function
[Events,ETimes]=CEventsGenerate(States,STimes,E)
Events=[ ]; Etimes=[ ];
cumsumE=cumsum(E);
for k=2:length(STimes,1)
    st=States(k−1);
    ERate=cumsumE(end,st);
    time=STimes(k−1)−log(rand)/ERate;
    while time<STimes(k)
        Events(end+1)=[find(rand*ERate<cumsumE(:,st),1);
        ETimes(end+1)=time;
        time=time−log(rand)/ERate;
    end
end
ETimes(end+1)=STime(end+1);
```

TABLE 18

Input and Output of CEventGenerate

| Type | Name | Description |
|---|---|---|
| Input | States | A Continuous-time Markov state sequence of length L. This (L + 1) × 2 array's $1^{st}$ column is the States and $2^{nd}$ column is starting times. The last entry on the $2^{nd}$ column is the end of the interval. |
| | E | An event Matrix. Must be nonnegative with at least as many rows as the largest entry of States. |

TABLE 18-continued

Input and Output of CEventGenerate

| Type | Name | Description |
|---|---|---|
| Output | Events | Continuous-time Hidden Markov event sequence of length L. This is a 2 × L array whose $1^{st}$ column is the Events and whose $2^{nd}$ column is the time of those Events. | nonevents may not be explicitly represented, the event sequence may be supplemented by time when an array becomes a two (2) column matrix whose first column may indicate the event, and second column may indicate the time of the event.

Referring to Table 20, in various embodiments, given a set of sparse events (a p×2 matrix of Events and integer times), an initial distribution of state, f, and an initial guess for the transition matrix T and event matrix E, this may create a transition matrix T and event matrix that may locally best

TABLE 19

Event Sequence for a Continuous-time Hidden Markov Model

| D | D | M | J | D | G | A | A | K | A | K | J | M | K | D |
|---|---|---|---|---|---|---|---|---|---|---|---|---|---|---|
| 0.145 | 0.197 | 0.502 | 0.733 | 1.476 | 2.102 | 2.457 | 2.477 | 2.580 | 2.914 | 2.950 | 4.067 | 4.134 | 4.338 | 4.760 |
| D | E | E | E | D | E | J | D | E | E | E | D | D | C | B |
| 4.914 | 5.147 | 5.776 | 5.826 | 6.064 | 6.278 | 6.872 | 7.057 | 7.214 | 7.863 | 8.142 | 8.477 | 10.131 | 10.300 | 10.347 |
| A | C | B | C | A | A | B | E | A | M | G | M | K | B | D |
| 10.563 | 10.815 | 11.260 | 11.353 | 11.412 | 11.497 | 11.838 | 12.579 | 13.133 | 13.253 | 13.350 | 13.407 | 13.606 | 13.941 | 13.948 |
| C | B | A | E | E | E | F | E | F | H | A | J | E | G | F |
| 14.274 | 14.358 | 14.603 | 15.400 | 15.415 | 16.767 | 16.889 | 16.936 | 16.972 | 17.752 | 18.529 | 18.533 | 19.052 | 19.167 | 19.168 |
| F | H | H | J | K | C | A | B | A | D | E | E | E | J | C |
| 19.295 | 19.995 | 20.060 | 20.218 | 20.523 | 21.034 | 21.330 | 21.613 | 22.305 | 23.152 | 23.195 | 23.395 | 23.590 | 24.444 | 25.349 |
| D | D | C | C | A | D | E | D | A | B | E | D | G | J | D |
| 25.401 | 25.485 | 26.037 | 26.171 | 26.271 | 26.454 | 28.906 | 29.311 | 29.912 | 29.974 | 30.387 | 30.542 | 31.388 | 31.480 | 31.914 |
| A | B | D | D | D | M | J | M | D | D | D | J | M | A | B |
| 32.148 | 32.317 | 32.608 | 32.647 | 33.417 | 34.546 | 34.561 | 34.623 | 34.808 | 34.843 | 35.086 | 35.602 | 36.066 | 36.144 | 36.287 |
| A | B | E | D | E | E | E | E | E | E | E | E | D | D | J |
| 36.357 | 36.402 | 37.534 | 39.470 | 40.238 | 40.367 | 40.947 | 41.184 | 41.203 | 41.510 | 41.717 | 42.204 | 42.227 | 42.249 | 42.723 |
| D | D | D | B | C | A | B | C | A | B | E | D | D | D | J |
| 43.286 | 43.488 | 43.573 | 43.966 | 44.067 | 44.678 | 44.706 | 44.851 | 45.033 | 45.604 | 45.803 | 46.032 | 46.086 | 46.593 | 46.796 |
| E | E | E | G | M | G | E | F | F | A | K | J | A | A | B |
| 47.992 | 48.089 | 48.331 | 48.926 | 49.169 | 49.309 | 50.371 | 50.621 | 50.733 | 51.164 | 51.226 | 51.371 | 51.423 | 51.791 | 52.074 |
| D | D | C | D | C | A | C | D | E | E | E | E | D | D | D |
| 52.087 | 52.146 | 52.573 | 52.679 | 53.150 | 53.161 | 53.257 | 53.894 | 54.169 | 54.181 | 54.213 | 54.787 | 55.724 | 56.117 | 56.155 |
| E | D | E | B | D | E | E | D | E | C | F | E | F | H | F |
| 56.927 | 57.150 | 57.194 | 57.550 | 58.572 | 58.637 | 58.672 | 58.879 | 59.336 | 60.100 | 60.463 | 60.647 | 62.161 | 62.190 | 62.348 |
| D | E | E | F | G | H | G | H | F | K | L | A | J | C | B |
| 63.511 | 63.557 | 63.567 | 63.931 | 64.404 | 64.731 | 64.989 | 65.301 | 65.835 | 66.480 | 66.500 | 66.783 | 67.359 | 67.633 | 67.918 |
| A | A | A | E | E | J | G | K | K | F | J | K | A | M | M |
| 67.992 | 68.026 | 68.377 | 68.602 | 69.235 | 69.356 | 69.365 | 72.044 | 72.334 | 72.637 | 72.924 | 73.052 | 73.577 | 73.668 | 73.853 |
| J | J | E | E | E | E | E | M | G | M | M | F | E | D | G |
| 74.077 | 74.106 | 74.600 | 74.822 | 75.021 | 75.412 | 75.604 | 76.951 | 76.984 | 77.125 | 77.421 | 77.918 | 77.981 | 79.170 | 79.554 |
| M | L | K | L | J | E | E | E | E | E | D | D | G | E | J |
| 79.580 | 79.822 | 80.310 | 80.551 | 80.67 | 81.07 | 81.756 | 82.125 | 82.213 | 83.329 | 83.529 | 83.791 | 84.369 | 84.710 | 85.074 |
| M | J | D | D | C | C | C | B | D | E | D | D | D | E | D |
| 85.205 | 85.386 | 85.565 | 85.730 | 85.744 | 85.779 | 85.867 | 85.890 | 85.985 | 86.306 | 87.091 | 87.522 | 87.765 | 87.832 | 89.006 |
| E | D | F | F | E | G | J | I | I | D | E | E | E | E | J |
| 89.375 | 89.569 | 90.514 | 90.542 | 90.635 | 90.774 | 90.969 | 91.012 | 91.124 | 92.231 | 92.636 | 93.377 | 93.823 | 93.886 | 94.530 |
| G | A | A | J | D | D | D | K | B | D | A | G | E | | |
| 94.899 | 95.069 | 95.171 | 95.186 | 96.061 | 96.073 | 96.464 | 96.803 | 97.170 | 98.787 | 99.203 | 99.685 | 99.977 | 100.000 | |

Continuous-Time Baum-Welch

This section develops a Baum-Welch training for Continuous-time Hidden Markov Models, according to various embodiments. A series of algebraically equivalent computer programs may be created. The 'proof' of equivalency of two programs may be through testing to show both programs provide the same result for the same data. In one embodiment, for example, the only differences may be from rounding.

Sparse Baum-Welch

Conventionally, Baum-Welch training assumes there is exactly one event per time step. In various embodiments, for example, by using 'nonevent' as an event, BaumWelch may be modified so that it may allow either zero or one event per time step. For example, Table 20 shows BaumWelshSparse formed by declaring the highest indexed event as the nonevent, and handling it implicitly, according to various embodiments. So, in one embodiment, the event matrix may 'lose' its last row, and its columns may sum to one at most (the difference being the probability of no event). Since match the events. If there is an event at every time step, this may be equivalent to BaumWelch Table 12. The event sequence may not end at the last event, so an extra last entry in column 2 may be the step after the event sequence ends. This may be similar to Table 19 except that all times still may comprise integers. Table 21 shows input and output for BWSparse according to various embodiments.

In various embodiments, BWSparse may run on the same input as BaumWelch in Table 12. An event sequence may be formed, for example, on ten thousand (10,000) steps with but 984 steps being event 50 (the last event). By making event 50 the "nonevent," a 984×2 sparse event sequence may be formed. For each, random transition and event matrices may be made involving 1, 2, . . . , 50 hidden states. The last row may be stripped from the event matrix for BWSparse. Both programs may run, for example, one thousand (1,000) iterations. For example, in one embodiment, the maximum difference in the output may be about 1.5× $10^{-10}$, verifying that BWSparse is equivalent to Baum-Welch. That is, though more complex, BWSparse may be slightly faster than BaumWelch.

In various embodiments, the loops in the forward and backward part of BWSparse may be simplified. For example, in one embodiment, "for i=t(j)+1:t(j+1)−1, f(i+1, :)=f(i, :)*TLast; end" could become "f(t(j+1), :)= f(t(j), :)*TLast^(t(j+1)−t(j)−1)." This, however, may create problems. This may leave unassigned values for f(i, :) when i is strictly between t(j) and t(j+1). Also, computing a matrix power may take more work than many matrix-vector multiplications.

TABLE 20

BWSparse

```
function [T,E]=BWSparse(Events,T,E,f,maxIter,tol)
oldloglike=−inf; e=Events(:,1); t=Events(:,2);
for r=1:maxIter
   ELast=1−sum(E,1);
   for k=1:size(T,2) S(k,:)=ELast.*T(k,:); end
   for i=1:t(1)−1 f(i+1,:)=f(i,:)*S; end
   for j=1:size(Events,1)−1
      scaled=(f(t(j),:)*T).*E(e(j),:);
      scaling(j)=sum(scaled);
      f(t(j)+1,:)=scaled/scaling(j);
      for i=t(j)+1:t(j+1)−1 f(i+1,:)=f(i,:)*S; end
   end
   scaling(size(Events,1))=sum(f(t(end),:));
   b(t(end),:)=1/scaling(size(Events,1));
   for j=size(Events,1)−1:−1:1
      for i=t(j+1)−1:−1:t(j)+1
         b(i,:)=b(i+1,:)*S';
      end
      b(t(j),:)=(b(t(j)+1,:).*E(e(j), :))*T'/scaling(j);
   end
   for i=t(1)−1:−1:1 b(i,:)=b(i+1,:)*S'; end
   E=zeros(size(E));
   for j=1:size(Events,1)−1
      E(e(j),:)=E(e(j),:)+f(t(j)+1,:).*b(t(j)+1,:);
   end
   R=T.*((f(1:end−1,:)'*b(1:end−1,:))/T');
   for k=1:size(T,2)
      T(k,:)=R(k,:)/sum(R(k,:));
      E(:,k)=E(:,k)/sum(R(:,k));
   end
   loglike=sum(log(scaling));
   if loglike<oldloglike+tol, break, end
   oldloglike=loglike;
end
```

TABLE 21

Input and Output for BWSparse

| Type | Name | Description |
| --- | --- | --- |
| Input | Events | A (L + 1) × 2 matrix with Events in column 1 and integer time steps in column 2. The last entry in column 2 is 1 plus the length of the event sequence. |
| | T | A nonnegative n × n matrix whose rows add to one. This is the initial value of the transition matrix. |
| | E | A nonnegative matrix whose columns add to at most one. It must have n columns and at least as many rows as the largest value in column 1 of Events. This is the initial value of the event Matrix. |
| | f | The probability distribution at step 0. This must a nonnegative row vector whose entries add to one. If the Hidden Markov Model is in state k at step 0, f is a zero except for a one in the $k^{th}$ entry. |
| | maxIter | Maximum number of iteration of the forward-backward algorithm. |
| | tol | Iteration stops when the increase in log-likelihood in consecutive iterations is less than tol. |
| Output | T E | Transition and Event Matrices that together maximizes the log-likelihood. |

Skipping Nonevents

In various embodiments, for example, to allow Baum-Welch training to "skip over" a sequence of nonevents, two related problems may need to be solved. In one embodiment, "f(t(j), :) *TLast^(t(j+1)−t(j)−1)" may need to be performed in $O(n^2)$ calculations (as opposed to $O(n^3)$ for a matrix multiplication). Also, in one embodiment, the transition and/or event matrix may need to be updated without using the skipped values.

In various embodiments, matrix diagonalization may solve both problems. A square matrix may be factored as A=PDQ where D is a diagonal matrix of eigenvalues of A, P is a matrix of associated eigenvectors for its columns, and Q is the inverse of P. While matrix diagonalization and inversion each may use $O(n^3)$ operations, they may need be done only once per iteration in various embodiments.

In various embodiments, diagonalization may allow multiplication of a vector by a matrix power in $O(n^2)$ operations. For example, in one embodiment, let d be the vector of diagonal entries of D. Then, it may be calculated that $vA^n=((vP)(D^n))Q=((vP)\cdot(d^n))Q\cdot$ where is entry-by-entry multiplication.

In various embodiments, Forward computations may involve two arrays with $f_1(k, :)=f(t_k+1, :)$ and $f_2(k, :)= f(t_{k+1}+1, :)$. Similarly, in various embodiments, it may be calculated that $b_1(k, :)=b(t_{k+1}, :)$ and $b_2(k, :)=b(t_k+1, :)$ for the backward computation.

Updating the transition matrix may be complex. The hard computation may be for the matrix R. For example, in one embodiment, let $u=b_1Q'$ and $v=f_1P$. Then (let $h_k=t_{k+1}-t_k-1$)

$$\sum_{j=1}^{L} b(j, :)(f(j, :))' = \qquad (11)$$

$$\left(\sum_{k=1}^{m}\sum_{j=t_k+1}^{t_k+1} b(j, :)(f(j, :))'\right) - b(L+1, :)(f(L+1, :))' =$$

$$\left(\sum_{k=1}^{m}\sum_{j=t_k+1}^{t_k+1} (S^{j-(t_k+1)})'b(t_k+1, :)(S^{t_{k+1}-j}f(t_{k+1}, :))'\right)$$

$$b(t_{m+1}, :)(f(t_{m+1}, :))' =$$

$$\left(\sum_{k=1}^{m}\sum_{j=0}^{h_k} Q^iD^jP'b_1(k,:)(f_1(k,:))'Q^iD^{h_k-1}P'\right) - b_1(m, :)(f_2(m, :))' =$$

$$Q'\left(\sum_{k=1}^{m}\sum_{j=0}^{h_k} (d^j \cdot u(k, :))(v(k, :) \cdot d^{h_k-j})^i\right)P' - b_1(m, :)$$

$$(f_2(m, :))' = Q'\left(\sum_{k=1}^{m} (u(k, :)(v(k, :))') \cdot \sum_{j=0}^{h_k} d^j(d^{h_k-j})'\right)$$

$$P' - b_1(m, :)(f_2(m, :))'.$$

Let W(h) be matrix of the inner sum. Then its pq entry may be calculated:

$$W(h)_{pq} = \sum_{j=0}^{h} d_p^j d_q^{h-j} = \begin{cases} (d_p^{h+1} - d_q^{h+1})/(d_p - d_q) & \text{if } d_p \neq d_q \\ (h+1)d_p^h & \text{if } d_p = d_q \end{cases} \qquad (12)$$

Then, it may be calculated:

$$R = T \cdot \left(\left(\sum_{j=1}^{L} b(j, :)(f(j, :))'\right)(T^{-1})'\right) \qquad (13)$$

-continued $$= T \cdot \left( \left( Q' \left( \sum_{k=1}^{m} (u(k,:)(v(k,:))') \cdot \atop W(h_k) \right) P' b_1(m,:)(f_2(m,:))' \right) (T^{-1})' \right)$$

Table 22 shows BWPower that may perform the calculation of equation (13), for example, to maximize matrix operations and minimize repeated calculations, according to various embodiments. Referring to Table 22, in various embodiments, given a set of sparse Events (a px2 matrix of events and integer times), an initial distribution of state, f, and an initial guess for the transition matrix T and event matrix E, this may create a transition matrix T and event matrix E that may locally best match the Events. This may be algebraically equivalent to BWSparse but may be much faster if the data is sparse. In various embodiments, BWPower may run on the same inputs as BWSparse and produce (up to rounding) the same results in much less time. In various embodiments, BWPower may be much faster than BWSparse if the ratio of events to non-events is low.

TABLE 22

BWPower

```
function [T,E]=BWPowers(Events,T,E,f1,maxIter,tol)
oldloglike=-inf; Diag=find(eye(T,2));
e=Events(:,1); h=diff([0;Events(:,2)])-1;
for r=1:maxIter
    ELast=1-sum(E,1);
    for k=1:size(T,2) S(k,:)=ELast.*T(k,:); end
    [P,D]=eig(S); d=diag(D).';
    for k=1:size(T,2) dn(:,k)=d(k).^h; end
    for j=1:size(Events,1)-1
        f2=real(((f1(j,:)*P).*dn(j,:))/P);
        scaled=f2*T.*E(e(j),:);
        scaling(j)=sum(scaled);
        f1(j+1,:)=scaled/scaling(j);
    end
    f2=real(((f1(m,:)*P).*dn(m,:))/P);
    scaling(size(Events,1))=sum(f2);
    b1(size(Events,1),:)=1/scaling(size(Events,1));
    for j=size(Events,1)-1:-1:1
        b2(j,:)=real(((b1(j+1,:)/P.').*dn(j+1,:))*P.');
        b1(j,:)=(b2(j,:).*E(e(j),:))*T'/scaling(j);
    end
    E=zeros(size(E));
    for j=1:size(Events,1)-1
        E(e(j),:)=E(e(j),:)+f1(j+1,:).*b2(j,:);
    end
    for k=1:size(R,2) dn1(:,k)=d(k)*dn(:,k); end
    v=f1*P; vdn1=v.*dn1;
    u=b1/P.'; udn1=u.*dn1;
    R=v.'*udn1-vdn1.'*u;
    for k=1:size(R,2) R(k,:)=R(k,:)./(d-d(k)); end
    R(Diag)=((1+h).'*(v.*udn1))./d;
    for k=1:size(R,2) R(k,:)=R(k,:)./d; end
    R=S.*real((inv(P).*R-f2.'*(((b1(m,:)/P.')./d))*P.');
    for k=1:size(R,2)
        T(k,:)=R(k,:)/sum(R(k,:));
        E(:,k)=E(:,k)/sum(R(:,k));
    end
    loglike=sum(log(scaling));
    if loglike<oldloglike+tol, break, end
    oldloglike=loglike;
end
```

Changing Step Size

In various embodiments, the next operation toward a continuous Baum-Welch training is forming a sparse Baum-Welch training where the step size may be specified. Table 23 shows a function, BWPowerdt, for example, to form the sparse Baum-Welch training, according to various embodiments.

TABLE 23

BWPowerdt

```
function [T,E]=BWPowersdt(Events,T,E,f1,maxIter,tol,dt)
oldloglike=-inf; Diag=find(eye(T,2));
e=Events(:,1); h=diff([0;Events(:,2)])-dt;
for r=1:maxIter
    ESum=sum(E,1);
    for k=1:size(T,2) S(k,:)=-(1-dt*ESum).*T(k,:); end
    S(Diag)=S(Diag)+1+ESum-dt*ESum; [P,D]=eig(S);
    d=diag(D);
    for k=1:size(T,2) dn(:,k)=(1-dt*d(k)).^(h/dt); end
    for j=1:size(Events,1)-1
        f2=real(((f1(j,:)*P).*dn(j,:))/P);
        scaled=((1-dt)*f2+dt*f2*T).*E(e(j),:);
        scaling(j)=sum(scaled);
        f1(j+1,:)=scaled/scaling(j);
    end
    f2=real(((f1(m,:)*P).*dn(m,:))/P);
    scaling(m)=sum(f2); b1(m,:)=1/scaling(m);
    for j=size(Events,1)-1:-1:1
        b2(j,:)=real(((b1(j+1,:)/P.').*dn(j+1,:))*P.');
        temp=b2(j,:).*E(e(j),:);
        b1(j,:)=((1-dt)*temp+dt*temp*T')/scaling(j);
    end
    E=zeros(size(E));
    for j=1:size(Events,1)-1
        E(e(j),:)=E(e(j),:)+f1(j+1,:).*b2(j,:);
    end
    for k=1:size(T,2) dn1(:,k)=(1-dt*d(k))*dn(:,k); end
    v=f1*P; vdn1=v.*dn1; u=b1/P.'; udn1=u.*dn1;
    R=v.'*udn1-vdn1.'*u;
    for k=1:size(T,2) R(k,:)=R(k,:)./(d(k)-d.'); end
    R(Diag)=((h+dt).'*(v.*udn1))./(1-dt*d.');
    for k=1:size(T,2) R(k,:)=R(k,:)./(1-dt*d.'); end
    R1=Q.'*R-dt*f2.'*((b1(m,:)/P.')./(1-dt*d.'));
    R1=real(R1*P.'); R2=-S.*R1;
    for k=1:size(T,2)
        T(k,:)=R2(k,:)/(R1(k,k)+dt*sum(R2(k,:)));
        E(:,k)=E(:,k)/(R1(k,k)+dt*sum(R2(:,k)));
    end
    T(Diag)=T(Diag)+1-sum(T'); loglike=sum(log(scaling));
    if loglike<oldloglike+tol, break, end
    oldloglike=loglike;
end
```

Referring to Table 23, BWPowerdt may have an additional parameter dt for the step-size. In various embodiments, given the step size dt, a set of sparse Events (for example, a px2 matrix of events and times that are integer multiples of dt), an initial distribution of state, f, and an initial guess for the transition matrix T and event matrix E, this may create a transition matrix T and event matrix E that may locally best match the Events.

In various embodiments, when dt is one, BWPowerdt may be equivalent to BWPower in Table 22. When dt is one-half, this may add a nonevent between each step, thereby doubling the number of steps and spreading events by doubling their time. For example, to be equivalent, the initial guess may also need to adapt. Since events may occur at half the rate, the initial event matrix may be transformed by halving its entries. And since the rate between States may also be halved, the off-diagonal entries of the initial transition matrix may be halved with its diagonal entries increased to compensate (so that the column sum may be one, for example).

In various embodiments, for dt less than one, BWPowerdt with initial transition matrix T and event matrix E may be equivalent to BWPower with the second column of Events multiplied by $dt^{-1}$ (the reciprocal to spread out the time), the initial transition matrix being $(1-dt)I+dt\,T$, and the initial event matrix being dt E. Then, for example, to be algebraically equivalent, the output matrices of BWPowerdt transformed as above may be equal to the output of BWPower (within rounding error). In various embodiments, testing indicates that with the same event sequence used in comparison of BWPower and BWSparse in section 4.2, BWPowerdt and BWPower may be equivalent for n=10 and dt=1, ½, ¼, . . . , 1/512.

In various embodiments, BWPowerdt may be formed, for example, by adding a few lines at the start and end to do input and output transformations. However, in various embodiments, BWPowerdt may be formed so that dt may be set to zero (0) and take the limit. Accordingly, in various embodiments, it may be needed to manipulate BWPowerdt to redefine its variables so that none of its values may grow without bound as dt goes to zero (0). In various embodiments, for example, the exception may be the line, as shown in equation (14):

for k=1:n dn(:,k)=(1−dt*d(k))^(h/dt); end    (14)

Here, the exponent may go to infinity as dt goes to zero (0). However, in various embodiments, the overall calculation may go to a limit.

Continuous Hidden-Markov Models

In various embodiments, dt may be set to zero (0) in BWPowerdt, for example, to create BWContinuous as shown in Table 24. Referring to Table 24, in various embodiments, given sparse Events (for example, a p×2 matrix of events and times), an initial distribution of state, f, and an initial guess for the continuous-time transition matrix T and continuous-time event matrix E, a transition matrix 1 and event matrix E that may locally best match the Events may be identified (e.g., calculated). This may be the limit of BWPowerdt as dt goes to zero.

TABLE 24

BWContinuous

```
Function [T,E]=BWContinuous(Events,T,E,f1,maxIter,tol)
oldloglike=−inf; Diag=find(eye(T,2));
e=Events(:,1); h=diff([0;Events(:,2)]);
for r=1:maxIter
    ESum=sum(E,1); S=T; S(Diag)=S(Diag)−ESum;
    [P,D]=eig(S); d=diag(D); dn=exp(h*d.');
    for j=1:size(Events,1)−1
        f2=real(((f1(j,:)*P).*dn(j,:))/P);
        scaled=f2.*E(e(j),:);
        scaling(j)=sum(scaled);
        f1(j+1,:)=scaled/scaling(j);
    end
    f2=real(((f1(m,:)*P).*dn(m,:))/P);
    scaling(m)=sum(f2);
    b1(m,:)=1/scaling(m);
    for j=size(Events,1)−1:−1:1
        b2(j,:)=real(((b1(j+1,:)/P.').*dn(j+1,:))*P.');
        b1(j,:)=b2(j,:).*E(e(j),:)/scaling(j);
    end
    E=zeros(size(E));
    for j=1:size(Events,1)−1
        E(e(j),:)=E(e(j),:)+f1(j+1,:).*b2(j,:);
    end
    v=f1*P; vdn=v.*dn; u=b1/P.'; udn=u.*dn;
    R=v.'*udn−vdn.'*u;
    for k=1:size(T,2) R(k,:)=R(k,:)./(d.'−d(k)); end
    R(Diag)=h.'*(v.*udn);
    R1=real(Q.'*R*P.');
    R2=−S.*R1;
    for k=1:size(T,2)
        T(k,:)=R2(k,:)/R1(k,k);
        E(:,k)=E(:,k)/R1(k,k);
    end
    T(Diag)=T(Diag)−sum(T');
    loglike=sum(log(scaling));
    if loglike<oldloglike+tol, break, end
    oldloglike=loglike;
end
```

In various embodiments, when dt is set to zero, the algorithm may be simplified, for example, as shown in equation (15):

$$\lim_{h \to 0}(1 + ah)^{b/h} = \exp(ab). \qquad (15)$$

In various embodiments, as dt goes to zero in the inside of equation (14), the limit may become dn(:,k)=exp(−h*d (k)). This may be matricized, for example, to eliminate the loop in equation (14). Thus, equation (14) may be reduced to a simpler form, as shown in equation (16):

$$dn=\exp(-h*d^{.'});. \qquad (16)$$

In various embodiments, the appearance of exponential function may be expected. Calculating the forward and backward probabilities of a discrete Hidden Markov Model may be a linear difference equation whose explicit solutions are a linear combination of powers. The same calculation for a continuous Hidden Markov Model may be a linear differential equation whose explicit solutions are a linear combination of exponentials.

Otherwise, in various embodiments, the limit may be straightforward as zero may replace dt and opportunistic simplifications may be done. A paradigm shift may arise as a domain may move from discrete to continuous Hidden Markov Models. In the former, for example, columns of the transition matrix may sum to one; while in the latter, columns may sum to zeros with the diagonals. Without the shift, in some embodiments, for example, one (1) may be subtracted from or added to the diagonal of T. Thus, in various embodiments, the shift may simplify the code, and reduce calculations.

Figure 8:
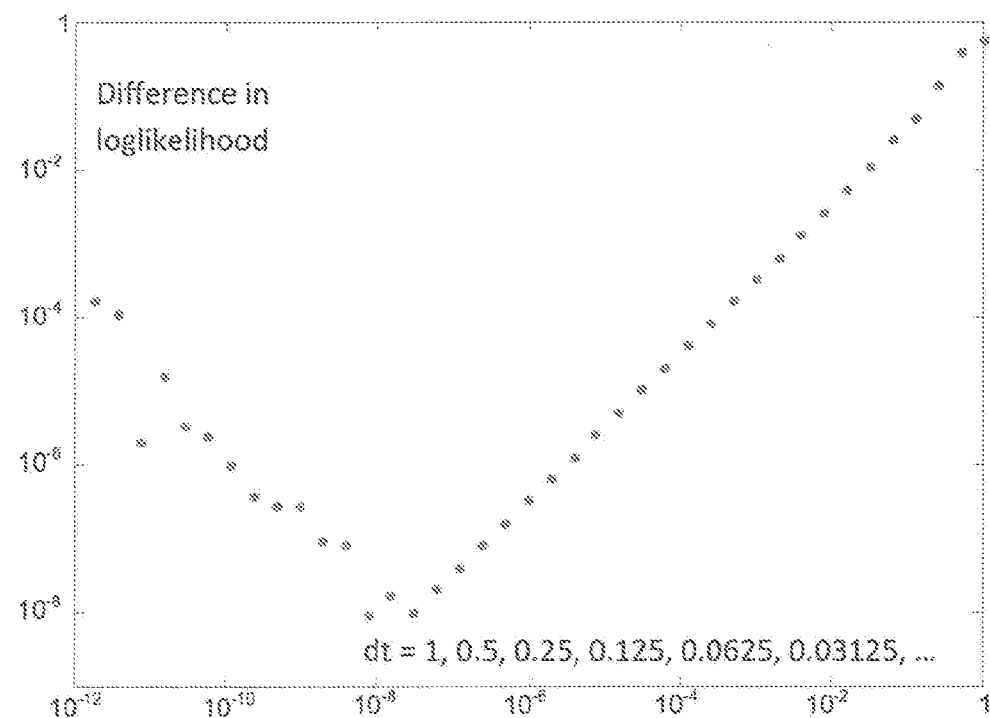
FIG. 8 shows a log-log plot of the difference between BWContinuous and BWPowerdt, according to various embodiments.

Verification of BWContinuous: In various embodiments, while BWContinuous may not be algebraically equivalent to any previous program, it may be part of a limiting processing using BWPowerdt. FIG. 8 shows a log-log plot of the difference between BWContinuous and BWPowerdt with dt=1, ½, ¼, . . . , according to various embodiments. It may seem as expected for a limiting process. The difference may decrease linearly until dt is around $10^{-8}$ (the square root of machine epsilon). Then, rounding errors may dominate, and the error may increase linearly but erratically as dt continues to shrink. In various embodiments, this may support the assumption that the limiting process is correct.

Example Result

Figure 9:
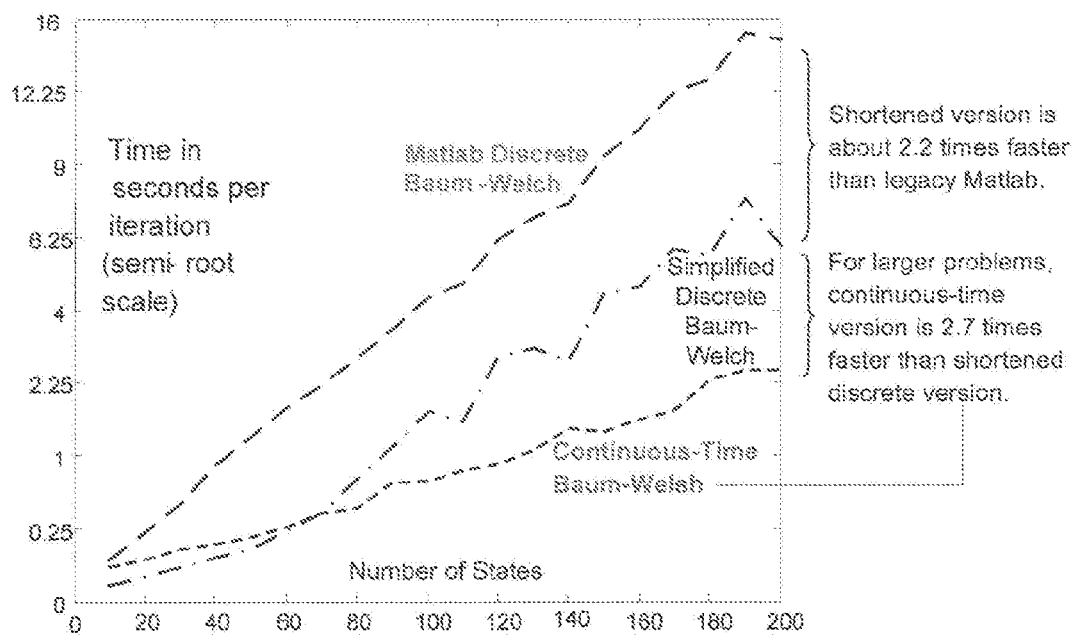
FIG. 9 shows performance comparisons among various Baum Welch trainings, according to various embodiments.

In various embodiments, when there is one event per time step, the continuous-time Baum-Welch training may perform faster than a Discrete Baum-Welch training, for example, for large problems, as shown in FIG. 9.

It is noted that the events analyzed by the continuous-time Hidden Markov Model and Baum-Welch training, according to various embodiments, may comprise a set of events in various settings. In various embodiments, the events may comprise activities related to satellite, missile or other artillery launches, or (military or non-military) vehicle movements and so on. In such cases, the continuous-time Hidden Markov Model and Baum-Welch training, according to various embodiments, may be used as a system and/or device for detecting and warning of a (potential) threat. For example, in one embodiment, information regarding such activities or events may be obtained from one or more intelligence data sources internal or external to the system and/or device.

The continuous-time Hidden Markov Model and Baum-Welch training, according to various embodiments, may be applied in areas such as network performance evaluation, memory workload evaluation, cryptanalysis, speech recognition/synthesis/tagging, machine translation, partial discharge, gene prediction, bio-sequences alignment, activity recognition, protein folding, metamorphic virus detection, and so on.

In various embodiments, the apparatus, systems, and methods described herein may operate to receive information identifying and describing at least one of a set of events, an initial distribution of a plurality of states, an initial transition matrix, or an initial event matrix; generate, based at least in part on the information, at least one intermediate transition matrix and at least one intermediate event matrix describing a sparse Baum-Welch training that allows no event to occur at one or more time steps; and transform the at least one intermediate transition matrix and the at least one intermediate event matrix into a transition matrix and an event matrix describing a continuous-time Baum-Welch training, the continuous-time Baum-Welch training allowing events to occur simultaneously or at sporadic time intervals in a Markov model including a hidden Markov Model having more than two hidden states. Other embodiments are also possible. More explanations of the generation of the continuous-time Baum-Welch training, according to various embodiments, are provided below, for example, with respect to FIGS. 10-12.

Systems, Apparatus, Methods and Machine-Readable Media

Figure 10:
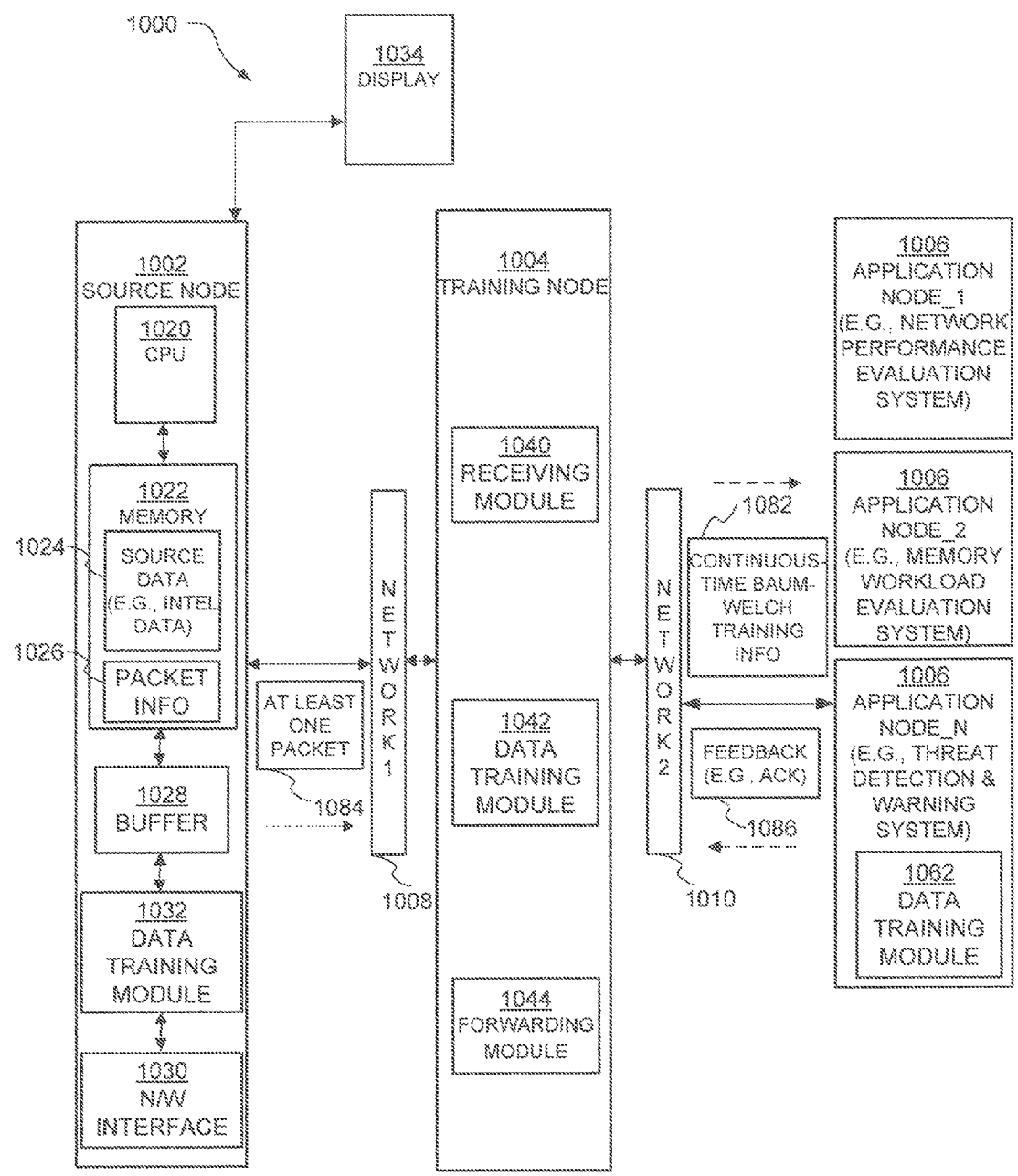
FIG. 10 shows a block diagram of a network environment, including a system and apparatuses, according to various embodiments.

FIG. 10 shows a block diagram of a network environment, including a system 1000 and apparatuses 1002, 1004, 1006, according to various embodiments. In various embodiments, a source node 1002 (e.g., intelligence data system) may comprise a computer system including at least one of a CPU (central processing unit or processor) 1020, memory 1022, buffer 1028, network interface 1030, or display 1034. It is noted that although not shown in FIG. 10 for clarity, each of the apparatus 1004, 1006 may comprise hardware components similar to or same as the CPU 1020, memory 1022, buffer 1028, network interface 1030, or display 1034.

The source node 1002 may collect information identifying and describing at least one of a set of events, an initial distribution of a plurality of states, an initial transition matrix, or an initial event matrix. The information may be gathered in various settings, and be saved, for example, in the memory 1022 in the form of source data 1024 (e.g., intelligence data). Then, the source node 1002 may provide the source data 1024 to one or more of a plurality of application nodes 1006 for further processing. In various embodiments, the source node 1002 may first organize its message including at least a portion of the source data 1024 (e.g., intelligence data) into the form of packet information 1026. The source node 1002 may then output the packet information 1026, for example, as a function of the network interface 1030.

In various embodiments, the source node 1002 and the application nodes 1006 may communicate indirectly, for example, via a training node 1004 (e.g., an intermediate node). For example, in one embodiment, the source node 1002 and the application nodes 1006 may not communicate directly with each other, but both may communicate with the training node 1004 (e.g., the intermediate node).

In various embodiments, the training node 1004 may receive, for example, as a function of a receiving module 1040, at least one packet 1084 of the packet information 1026 directly from the source node 1002 (if they are locally connected) or via a network 1008 (e.g., network 1). Then, the training node 1004 may process, for example, as a function of a data training module 1042, the at least one packet 1084 received from the source node 1002. In one embodiment, the data training module 1042 may generate, from the information included in the at least one packet 1084 describing the set of events, information describing a continuous-time Baum-Welch training 1082 using methods described herein. More explanations regarding the operations of the data training module 1042 according to various embodiments are provided below with respect to FIG. 11. The information describing the continuous-time Baum-Welch training 1082 may then be transmitted, for example, as a function of a forwarding module 1044 from the training node 1004 to one or more of the plurality of application nodes 1006 directly (if they are locally connected) or via a network 1010 (e.g., network 2).

In various embodiments, the application node 1006 may receive at least a portion of the information describing the continuous-time Baum-Welch training 1082 transmitted from the training node 1004. In one embodiment, for example, the application node 1006 may comprise at least one of a thread detection and warning system, a network performance evaluation system, a memory workload evaluation system or any other system capable of utilizing the continuous-time Baum-Welch training information 1082. When received, the application node 1006 may utilize the information for its own purposes, such as threat prediction and warning, network performance evaluation or memory workload evaluation, and so on. In one embodiment, the application node 1006 may provide a feedback 1086, such as an acknowledgement or processing result, to the training mode 1004.

The system 1000 and apparatuses 1002, 1004, 1006 in FIG. 10 may be implemented in a machine-accessible and readable medium that is operational over one or more networks, such as the networks 1008, 1010. Each of the networks 1008, 1010 may be wired, wireless, or a combination of wired and wireless. Also, at least one of the networks 1008, 1010 may be a satellite-based communication link, such as the WINDS (Wideband InterNetworking engineering test and Demonstration Satellite) communication link or any other commercial satellite communication links.

Although the system 1000 is shown to include the (separate) apparatuses 1002, 1004, 1006 for explanation and/or clarity, in various embodiments, some or all of the system 1000 may be implemented as a single entity, and yet maintain the same functionality. Also, in various embodiments, the generation of the continuous-time Baum-Welch training information 1082 may be performed by other nodes, such as the source node 1002 or the application node 1006. In such a case, in one embodiment, the source node 1002 and the application node 1006 may use their own data training module 1032 or 1062 resided therein.

Figure 11:
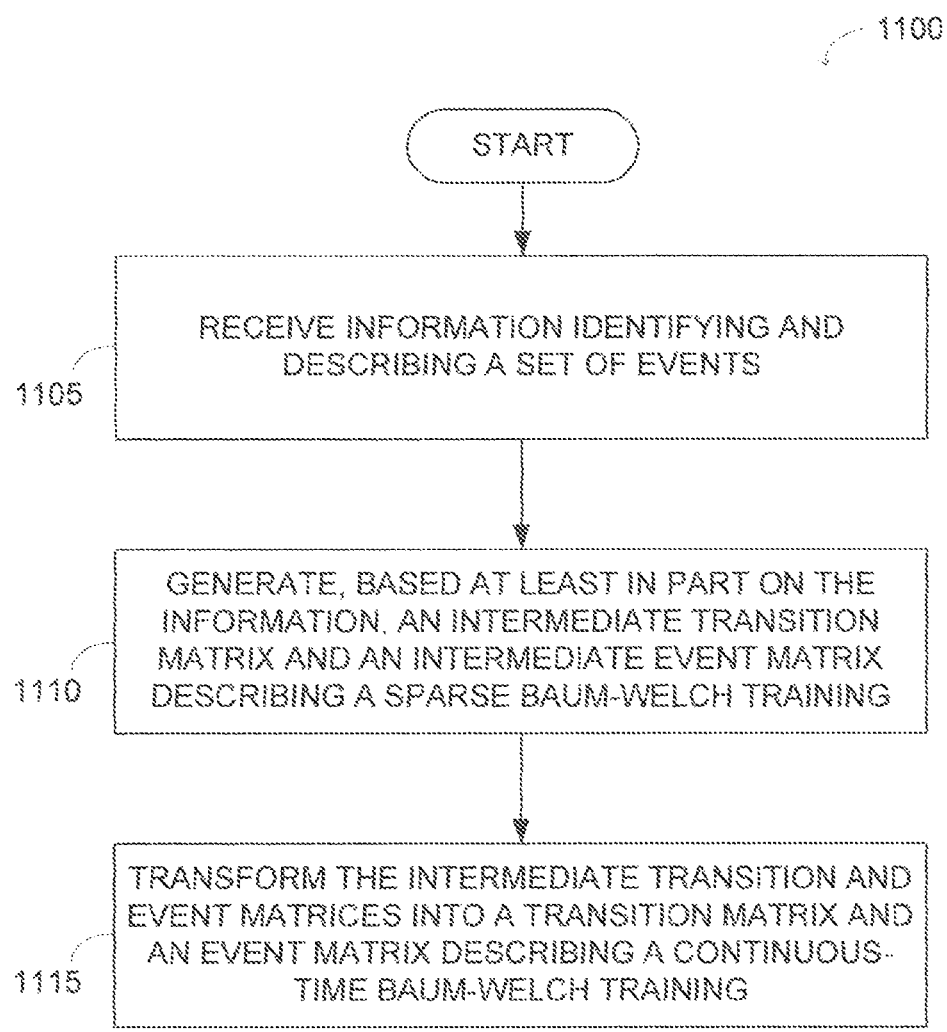
FIG. 11 shows methods for generating a transition matrix and an event matrix describing a continuous-time Baum-Welch training, according to various embodiments.

The system 1000 and apparatuses 1002, 1004, 1006, such as the data training modules 1032, 1042, 1062, may be used to implement, among other things, the processing associated with the computer-implemented methods 1100 of FIG. 11. Modules may comprise hardware, software, and firmware, or any combination of these. Also, some or all of the modules disclosed herein may be implemented as a single entity and yet maintain the same functionality.

In various embodiments, an apparatus (e.g., the training node 1004) may comprise: one or more processors to execute a data training module (e.g., the data training module 1042), the data training module configured to:

receive information identifying and describing at least one of a set of events, an initial distribution of a plurality of states, an initial transition matrix, or an initial event matrix; generate, based at least in part on the information, at least one intermediate transition matrix and at least one intermediate event matrix describing a sparse Baum-Welch training that allows no event to occur at one or more time steps; and transform the at least one intermediate transition matrix and the at least one intermediate event matrix into a transition matrix and an event matrix describing a continuous-time Baum-Welch training, the continuous-time Baum-Welch training allowing events to occur simultaneously or at sporadic time intervals in a Markov model including a Hidden Markov Model having more than two hidden states. Additional embodiments may be realized.

In various embodiments, the data training module may be configured to identify a time step at which no event occurs as a nonevent.

In various embodiments, the data training module may be configured to skip over values corresponding to nonevents from the initial event matrix.

In various embodiments, the data training module may be configured to set zero as a step size for the sparse Baum-Welch training.

In various embodiments, the data training module may be configured to use the zero value selected as the step size to generate the transition matrix and the event matrix.

In various embodiments, the data training module may be configured to identify, using the continuous-time Baum-Welch training, and the Hidden Markov Model that best matches the set of events.

In various embodiments, the data training module may be configured to perform polynomial-time local optimization to identify the Hidden Markov Model that best matches the set of events.

In various embodiments, the data training module is configured to determine entries for the transition matrix such that its columns sum to zeros with diagonals.

In various embodiments, the data training module may be configured to categorize a first event of the set of events as a happening based on determining that the first event is to occur at any time; and to categorize a second event of the set of events as an observation based on determining that the second event is to occur or not occur only when observed.

In various embodiments, a system (e.g., the system 1000) may comprise an intelligence data source (e.g., the source node 1002) to collect and provide information identifying and describing at least one of a set of events, an initial distribution of a plurality of states, an initial transition matrix, or an initial event matrix; and one or more processors to execute a data training module (e.g., the data training module 1032), the data training module configured to: receive the information from the intelligence data source; and transform the initial transition matrix and the initial event matrix into a transition matrix and an event matrix describing a continuous-time Baum-Welch training, the continuous-time Baum-Welch training allowing events to occur simultaneously or at sporadic time intervals in a Markov model including a Hidden Markov Model having more than two hidden states.

FIG. 11 shows methods 1100 for generating a transition matrix and an event matrix describing a continuous-time Baum-Welch training, according to various embodiments. The methods 1100 may be implemented, for example, using the system 1000 and/or apparatuses 1002, 1004, 1006 shown in FIG. 10, among others. In various embodiments, the methods 1100 may begin, at block 1105, with receiving, for example, at the training node 1004, information identifying and describing at least one of a set of events, an initial distribution of a plurality of states, an initial transition matrix, or an initial event matrix. In one embodiment, for example, the information may be transmitted from an external system, such as the source node 1002.

In various embodiments, at block 1110, at least one intermediate transition matrix and at least one intermediate event matrix describing a sparse Baum-Welch training may be generated based at least in part on the information, for example, as a function of the data training module 1042. In one embodiment, the sparse Baum-Welch training may allow no event to occur at one or more time steps.

In various embodiments, at block 1115, the at least one intermediate transition matrix and the at least one intermediate event matrix may be transformed into a transition matrix and an event matrix describing a continuous-time Baum-Welch training, for example, as a function of the data training module 1042. In one embodiment, the continuous-time Baum-Welch training may allow events to occur simultaneously or at sporadic time intervals in a Markov model including a Hidden Markov Model having more than two hidden states.

In various embodiments, the generating of the at least one intermediate transition and event matrices may comprise identifying a time step at which no event occurs as a nonevent.

In various embodiments, the generating of the at least one intermediate transition and event matrices may comprise setting, as the nonevent the highest indexed event of the initial event matrix.

In various embodiments, the generating of the at least one intermediate transition and event matrices may comprise removing the last row from the initial event matrix.

In various embodiments, the generating of the at least one intermediate transition and event matrices may comprise supplementing an event sequence with a time array including a first column corresponding to the event, and a second column corresponding to the time steps at which the event occurs.

In various embodiments, the generating of the at least one intermediate transition and event matrices may comprise skipping over values corresponding to nonevents from the initial event matrix.

In various embodiments, the skipping over the values may comprise performing matrix diagonalization in relation with the initial event matrix.

In various embodiments, the generating of the at least one intermediate transition and event matrices may comprise changing a step size for the sparse Baum-Welch training to a value within a range between one and zero to update the at least one intermediate transition and event matrices based at least in part on the step size.

In various embodiments, the changing of the step size may comprise setting the step size to zero to be used to generate the transition matrix and the event matrix.

In various embodiments, the generating of the transition matrix and the event matrix may comprise verifying whether the transition and event matrices generated based on the zero step size match a corresponding one of the at least one intermediate transition and event matrices. In one embodiment, the verifying may comprise allowing differences attributable to rounding.

The methods 1100 may be performed by processing logic that may comprise hardware (e.g., dedicated logic, programmable logic, microcode, etc.), such as at least one processor, firmware, software module (such as running on a general purpose computing system or a dedicated machine), or any combination of these. The methods 100 are explained above with respect to the system 1000, source node 1002, training node 1004, and/or application node 1006 in FIG. 10 for convenient understanding. However, those skilled in the art will recognize that the methods 1100 may be performed by other systems and/or devices that provide substantially the same functionalities as the system 1000, source node 1002, training node 1004 and/or application node 1006.

Although only some activities are described with respect to FIG. 11, the methods 1100, according to various embodiments, may perform other activities, such as operations performed by the display 1034 and/or the forwarding module 1044 in FIG. 10, in addition to and/or as an alternative to the activities described with respect to FIG. 11.

The methods 1100 described herein do not have to be executed in the order described, or in any particular order. Moreover, various activities described with respect to the methods 1100 identified herein may be executed in repetitive, serial, heuristic, parallel fashion, or any combinations thereof. The individual activities of the methods 1100 described herein may also be combined with each other and/or substituted, one for another, in various ways. Information, including parameters, commands, operands, and other data, may be sent and received between corresponding modules or elements in the form of one or more carrier waves. Thus, many other embodiments may be realized.

In various embodiments, the methods 1100 described herein may be implemented in various devices, as well as in a machine-readable medium, such as a storage device, where the methods 1100 are adapted to be executed by one or more processors. Further details of such embodiments are described below with respect to FIG. 12.

Figure 12:
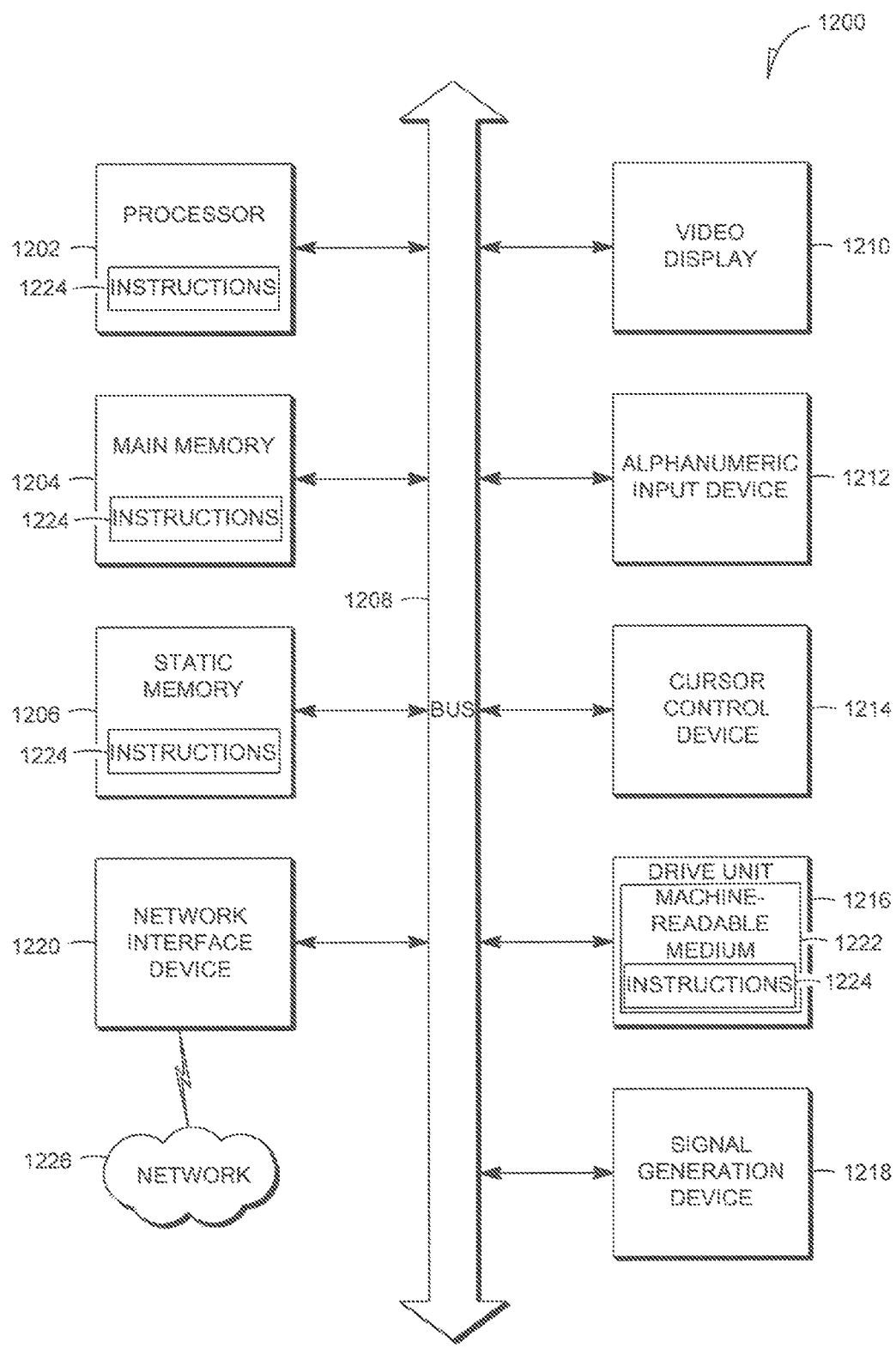
FIG. 12 shows a block diagram of an article of manufacture, including a specific machine, according to various embodiments.

FIG. 12 shows a block diagram of an article 1200 of manufacture, including a specific machine, such as the source node 1002, the training node 1004, or the application node 1006, according to various embodiments. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. In some embodiments, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, the article 1200 of manufacture, such as a computer, a memory system, a magnetic or optical disk, some other storage device, and/or any type of electronic device or system may include one or more processors 1202 coupled, for example, via a bus 1208 to a non-transitory machine-readable medium 1222 such as a storage device (e.g., removable storage media, as well as any memory including an electrical, optical, or electromagnetic conductor) having instructions 1224 stored thereon (e.g., computer program instructions), which when executed by the one or more processors 1202 result in the specific machine 1200, such as the source node 1002, the training node 1004, or the application node 1006, performing any of the actions described with respect to the methods above.

The machine 1200 may take the form of a specific computer system having the one or more processors (e.g., the processor 1202) coupled to a number of components directly, and/or using a bus (e.g., the bus 1208). In various embodiments, the machine 1200 may be similar to or identical to the apparatuses 1002, 1004, 1006 or the system 1000 shown in FIG. 10.

In various embodiments, referring to FIG. 12, it can be seen that the components of the machine 1200 may include a storage device, such as a main memory 1204, static or non-volatile memory 1206, and a drive unit 1216 (e.g., a mass storage). Other components coupled to the processor 1202 may include an input device, such as an alphanumeric input device 1212 or a cursor control device 1214 (e.g., a mouse). An output device, such as a video display 1210, may be located apart from the machine 1200, or made as an integral part of the machine 1200. A signal generation device 1218, such as an antenna or transceiver (receiver/transmitter), may also be connected to the bus 1208.

A network interface device 1220 to couple the machine 1200 and its components to a network 1226 may also be coupled to the bus 1208. The instructions 1224 may be transmitted or received over the network 1226 via the network interface device 1220 utilizing any one of a number of well-known transfer protocols (e.g., HyperText Transfer Protocol (HTTP) and/or Transmission Control Protocol (TCP/IP)). Any of these elements coupled to the bus 1208 may be absent, present singly, or present in plural numbers, depending on the specific embodiment to be realized.

The processor 1202, the memories 1204, 1206, and the storage device 1216 may each include instructions 1224 which, when executed, cause the machine 1200 to perform any one or more of the methods described herein. In some embodiments, the machine 1200 operates as a standalone device or may be connected (e.g., networked) to other machines. In a networked environment, the machine 1200 may operate in the capacity of a server or a client machine in server-client network environment, or as a peer machine in a peer-to-peer (or distributed) network environment.

The machine 1200 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 1200 is illustrated, the term "machine" shall also be taken to include any collection of machines that individually or jointly execute a set (or multiple sets) of instructions to perform any one or more of the methodologies discussed herein.

While the machine-readable medium 1222 is shown as a single medium, the term "machine-readable medium" should be taken to include a single medium or multiple media (e.g., a centralized or distributed database, and/or associated caches and servers, and or a variety of storage media, such as the registers of a corresponding one of the one or more processors 1202, memories 1204, 1206, and the storage device 1216 that store the one or more sets of instructions 1224). The term "machine-readable medium" shall also be taken to include any medium that is capable of storing, encoding or carrying a set of instructions for execution by the machine and that cause the machine 1200 to perform any one or more of the methodologies described herein, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method comprising:
   receiving, at a data training module executable by one or more hardware processors of a training node and from a source node, information identifying and describing at least one of a set of events, an initial distribution of a plurality of states, an initial transition matrix, or an initial event matrix;
   generating, at the data training module and based at least in part on the information, at least one intermediate transition matrix and at least one intermediate event matrix describing a sparse Baum-Welch training that allows no event to occur at one or more time steps;
   transforming, using the data training module, the at least one intermediate transition matrix and the at least one intermediate event matrix into a transition matrix and an event matrix describing a continuous-time Baum-Welch training, the continuous-time Baum-Welch training allowing events to occur simultaneously or at sporadic time intervals in a Markov model including a Hidden Markov Model (HMM) having more than two hidden states;
   providing, using the data training module, the transition matrix and the event matrix to an application node;
   receiving, at the data training module and from the application node, data indicating that a threat is detected based on the transition matrix and the event matrix; and
   providing, using the data training module and to a display of the source node, data which causes the display to provide a warning that the threat exists.

2. The method of claim 1, wherein the generating comprises:
   identifying a time step at which no event occurs as a nonevent.

3. The method of claim 2, wherein the generating comprises:
   setting, as the nonevent, a highest indexed event of the initial event matrix.

4. The method of claim 1, wherein the generating comprises:
   removing a last row from the initial event matrix.

5. The method of claim 1, wherein the generating comprises:
   supplementing an event sequence with a time array including a first column corresponding to the event, and a second column corresponding to the time steps at which the event occurs.

6. The method of claim 1, wherein the generating comprises:
   skipping over values corresponding to nonevents from the initial event matrix.

7. The method of claim 6, wherein the skipping over the values comprises:
   performing matrix diagonalization in relation with the initial event matrix.

8. The method of claim 1, wherein the generating comprises:
   changing a step size for the sparse Baum-Welch training to a value within a range between one and zero to update the at least one intermediate transition and event matrices based at least in part on the step size.

9. The method of claim 8, wherein the changing comprises:
   setting the step size to zero to be used to generate the transition matrix and the event matrix.

10. The method of claim 9, wherein the generating of the transition matrix and the event matrix comprises:
    verifying whether the transition and event matrices generated based on the zero step size match a corresponding one of the at least one intermediate transition and event matrices, the verifying allowing differences attributable to rounding.

11. An apparatus comprising:
one or more processors to execute a data training module, the data training module configured to:
receive, from a source node, information identifying and describing at least one of a set of events, an initial distribution of a plurality of states, an initial transition matrix, or an initial event matrix;
generate, based at least in part on the information, at least one intermediate transition matrix and at least one intermediate event matrix describing a sparse Baum-Welch training that allows no event to occur at one or more time steps;
transform the at least one intermediate transition matrix and the at least one intermediate event matrix into a transition matrix and an event matrix describing a continuous-time Baum-Welch training, the continuous-time Baum-Welch training allowing events to occur simultaneously or at sporadic time intervals in a Markov model including a Hidden Markov Model (HMM) having more than two hidden states;
provide the transition matrix and the event matrix to an application node;
receive, from the application node, data indicating that a threat is detected based on the transition matrix and the event matrix; and
provide, to a display of the source node, data which causes the display to provide a warning that the threat exists.

12. The apparatus of claim 11, wherein the data training module is configured to:
identify a time step at which no event occurs as a nonevent.

13. The apparatus of claim 11, wherein the data training module is configured to:
skip over values corresponding to nonevents from the initial event matrix.

14. The apparatus of claim 11, wherein the data training module is configured to:
set zero as a step size for the sparse Baum-Welch training.

15. The apparatus of claim 14, wherein the data training module is configured to:
use the zero value selected as the step size to generate the transition matrix and the event matrix.

16. The apparatus of claim 11, wherein the data training module is configured to:
identify, using the continuous-time Baum-Welch training, the HMM that best matches the set of events.

17. The apparatus of claim 15, wherein the data training module is configured to:
perform polynomial-time local optimization to identify the HMM that best matches the set of events.

18. The apparatus of claim 11, where the data training module is configured to:
determine entries for the transition matrix such that its columns sum to zeros with diagonals.

19. The apparatus of claim 11, wherein the data training module is configured to:
categorize a first event of the set of events as a happening based on determining that the first event is to occur at any time; and
categorize a second event of the set of events as an observation based on determining that the second event is to occur or not occur only when observed.

20. A system comprising:
an intelligence data source node to collect and provide information identifying and describing at least one of a set of events, an initial distribution of a plurality of states, an initial transition matrix, or an initial event matrix, the intelligence data source node including a display;
an application node to determine whether a threat exists; and
one or more processors to execute a data training module, the data training module configured to:
receive the information from the intelligence data source node; and
transform the initial transition matrix and the initial event matrix into a transition matrix and an event matrix describing a continuous-time Baum-Welch training, the continuous-time Baum-Welch training allowing events to occur simultaneously or at sporadic time intervals in a Markov model including a Hidden Markov Model (HMM) having more than two hidden states
provide the transition matrix and the event matrix to the application node;
receive, from the application node, data indicating that a threat is detected based on the transition matrix and the event matrix; and
provide, to the display, data which causes the display to provide a warning that the threat exists.

* * * * *

UNITED STATES PATENT AND TRADEMARK OFFICE
CERTIFICATE OF CORRECTION

PATENT NO. : 9,508,045 B2
APPLICATION NO. : 13/588912
DATED : November 29, 2016
INVENTOR(S) : David Charles Fisher It is certified that error appears in the above-identified patent and that said Letters Patent is hereby corrected as shown below:

In the Specification

In Column 2, Line 63, delete "Mat lab" and insert --Matlab--, therefor

In Column 4, Table 4, Line 2, before "11111", insert --12233 11123 37777 33777 71122 22222 22222 22231 11111 11111--

In Column 5, Line 9, delete "(A)" and insert --(¼)--, therefor

In Column 6, Line 67, delete "F," and insert --E,--, therefor

In Column 7, Line 2, delete "distributions, f" and insert --distributions, f,--, therefor In Column 7, Line 29, after "step", insert --i--

In Column 7, Line 42, before "row", insert --(a--

In Column 7, Line 66, delete "Skew" and insert --skew--, therefor

In Column 9, Line 22, after "j", insert --in--

In Column 10, Line 15, delete "tower" and insert --lower--, therefor

In Column 11, Line 10, delete "1" and insert --T--, therefor

In Column 11, Table 13, Line 14, delete "forward-," and insert --forward-backward--, therefor In Column 11, Line 61, delete "is" and insert --1s--, therefor In Column 12, Equation (7), Line 10, delete "9.2385" and insert --0.2385--, therefor Signed and Sealed this
Eighth Day of May, 2018

Andrei Iancu
*Director of the United States Patent and Trademark Office*

CERTIFICATE OF CORRECTION (continued)
U.S. Pat. No. 9,508,045 B2

In Column 18, Line 10, before "that", insert --E--

In Column 18, Table 19, Row 29, delete "E" and insert --F--, therefor

In Column 18, Line 48, after "BaumWelch", insert --in--

In Column 18, Line 56, after "with", insert --all--

In Column 18, Line 66, delete "complex." and insert --complex,--, therefor

In Column 20, Line 21, delete "$vA^n=((vP)(D^n))Q=((vP)\cdot(d^n))Q\bullet$ where is" and insert --$vA^n=((vP)(D^n))Q=((vP)\cdot(d^n))Q$ where $\bullet$ is--, therefor In Column 23, Line 28, delete "1" and insert --T--, therefor In Column 29, Line 2, delete "100" and insert --1100--, therefor